US012801042B2

(12) United States Patent
Tsurumi et al.

(10) Patent No.: US 12,801,042 B2
(45) Date of Patent: Nov. 17, 2026

(54) ELECTROSTATIC IMAGE DEVELOPER, PROCESS CARTRIDGE, IMAGE FORMING APPARATUS, AND IMAGE FORMING METHOD

(71) Applicant: FUJIFILM BUSINESS INNOVATION CORP., Tokyo (JP)

(72) Inventors: Yosuke Tsurumi, Minamiashigara (JP); Takuro Watanabe, Minamiashigara (JP); Karin Sakai, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 664 days.

(21) Appl. No.: 18/318,310

(22) Filed: May 16, 2023

(65) Prior Publication Data

US 2024/0103391 A1 Mar. 28, 2024

(30) Foreign Application Priority Data

Sep. 22, 2022 (JP) ................................. 2022-151819

(51) Int. Cl.
*G03G 9/08* (2006.01)
*G01N 23/223* (2006.01)
*G03G 9/087* (2006.01)

(52) U.S. Cl.
CPC ......... *G03G 9/0819* (2013.01); *G01N 23/223* (2013.01); *G03G 9/08755* (2013.01); *G01N 2223/076* (2013.01)

(58) Field of Classification Search
CPC ............. G03G 9/0819; G03G 9/08755; G01N 23/223; G01N 2223/076
See application file for complete search history.

(56) References Cited

U.S. PATENT DOCUMENTS

| | | | | |
|---|---|---|---|---|
| 6,383,704 B1 * | 5/2002 | Kataoka | G03G 9/08782 430/108.6 |
| 2010/0173241 A1 * | 7/2010 | Ieda | G03G 9/09725 430/108.4 |
| 2013/0065170 A1 * | 3/2013 | Kadokura | G03G 9/08797 977/773 |

(Continued)

FOREIGN PATENT DOCUMENTS

| | | |
|---|---|---|
| JP | 2001-194825 A | 7/2001 |
| JP | 2004220005 A * | 8/2004 |

(Continued)

OTHER PUBLICATIONS

English machine translation of the description of JP-2004220005-A (Year: 2004).*

(Continued)

*Primary Examiner* — Boone Alexander Evans
(74) *Attorney, Agent, or Firm* — Oliff PLC

(57) ABSTRACT

An electrostatic image developer includes: toner particles; silica particles that are externally added to the toner particles and include an elemental nitrogen-containing compound containing elemental molybdenum and in which the ratio (Mo/Si) of a Net intensity of elemental molybdenum that is measured by X-ray fluorescence analysis to a Net intensity of elemental silicon in the silica particles that is measured by the X-ray fluorescence analysis is from 0.035 to 0.45 inclusive; and a carrier having a relative dielectric loss factor of from 0.5 to 2.0 inclusive.

11 Claims, 2 Drawing Sheets

(56) References Cited

U.S. PATENT DOCUMENTS

| | | | | |
|---|---|---|---|---|
| 2017/0329248 | A1* | 11/2017 | Nakamura | G03G 9/1133 |
| 2018/0364602 | A1* | 12/2018 | Kadonome | G03G 9/08755 |
| 2021/0003932 | A1 | 1/2021 | Tsuda et al. | |

FOREIGN PATENT DOCUMENTS

| | | | | |
|---|---|---|---|---|
| JP | 2005257993 | A | * | 9/2005 |
| JP | 2005-316057 | A | | 11/2005 |
| JP | 2008-209725 | A | | 9/2008 |
| JP | 2012-063718 | A | | 3/2012 |
| JP | 2021-151944 | A | | 9/2021 |

OTHER PUBLICATIONS

English machine translation of the description of JP-2005257993-A (Year: 2005).*

Feb. 23, 2024 Extended Search Report issued to European Patent Application No. 23173381.7.

Jun. 23, 2026 Office Action issued in Japanese Application No. 2022-151819.

* cited by examiner

ELECTROSTATIC IMAGE DEVELOPER, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2022-151819 filed Sep. 22, 2022.

BACKGROUND

(i) Technical Field

The present disclosure relates to an electrostatic image developer, a process cartridge, an image forming apparatus, and an image forming method.

(ii) Related Art

Japanese Unexamined Patent Application Publication No. 2005-257993 discloses a carrier including magnetic core particles and a carrier coating material that coats the surfaces of the magnetic core particles, wherein the loss tangent tan δ represented by the ratio of the dielectric loss factor ε" of the carrier to its dielectric constant ε' satisfies the following relational expressions:

$$a/b<6.5, \text{ and}$$

$$0.05<c<20$$

(where a is a DELoss value at a frequency DEFreq of $1\times10^2$ [Hz] and a measurement temperature of 30° C., b is a DELoss value at a frequency DEFreq of $1\times10^6$ [Hz] and a measurement temperature of 30° C., and c is a DELoss value at a frequency DEFreq of $1\times10^2$ [Hz] and a measurement temperature of 150° C.).

Japanese Unexamined Patent Application Publication No. 2005-316057 discloses a two-component developer including at least: a first toner containing a first external additive and first toner particles containing at least a binder resin and a coloring agent; and a first magnetic carrier, wherein the two-component developer is used for a developing method in which development is performed while a replenishment developer containing a second toner and a second magnetic carrier is replenished, wherein the first toner further contains first silica particles having a number average particle diameter of 50 nm or more in an amount of at least 0.5 parts by mass based on 100 parts by mass of the first toner particles, and wherein the loss tangent tan δ represented by the ratio of the dielectric loss factor ε" of the two-component developer to its dielectric constant ε' satisfies the following formulas:

$$0.06\leq\tan\delta1(2000\text{ Hz})\leq0.13, \text{ and}$$

$$0.04\leq\tan\delta2(2\times10^5\text{ Hz})\leq0.10$$

where tan δ1 is the loss tangent at a frequency of 2000 Hz, and tan δ2 is the loss tangent at a frequency of $2\times10^5$ Hz.

SUMMARY

In an external environment, particularly in a high-temperature high-humidity environment, charge leakage between a charged toner and a charged carrier occurs in some cases, so that the charged state may not be maintained at a high level. By reducing the dielectric loss factor of the carrier, a highly charged state can be obtained, and this state can be maintained. When an image with an extremely high image density is printed, it is necessary to increase an electric field applied during development. However, when the electric field is increased, local electrical discharge caused by the carrier is likely to occur between a magnetic brush and an image holding member. In this case, the toner is not transferred onto the discharge portions, and white spots may appear in the printed material.

Aspects of non-limiting embodiments of the present disclosure relate to an electrostatic image developer including toner particles containing silica particles externally added thereto and a carrier. With this electrostatic image developer, even when an image with an extremely high image density is printed, the amount of electric charge leakage at high temperature and high humidity is reduced, and the occurrence of white spots is reduced.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic image developer including: toner particles; silica particles that are externally added to the toner particles and include an elemental nitrogen-containing compound containing elemental molybdenum and in which the ratio (Mo/Si) of a Net intensity of elemental molybdenum that is measured by X-ray fluorescence analysis to a Net intensity of elemental silicon in the silica particles that is measured by the X-ray fluorescence analysis is from 0.035 to 0.45 inclusive; and a carrier having a relative dielectric loss factor of from 0.5 to 2.0 inclusive.

BRIEF DESCRIPTION OF THE DRAWINGS

An exemplary embodiment of the present disclosure will be described in detail based on the following figures, wherein.

DETAILED DESCRIPTION

Figure 1:
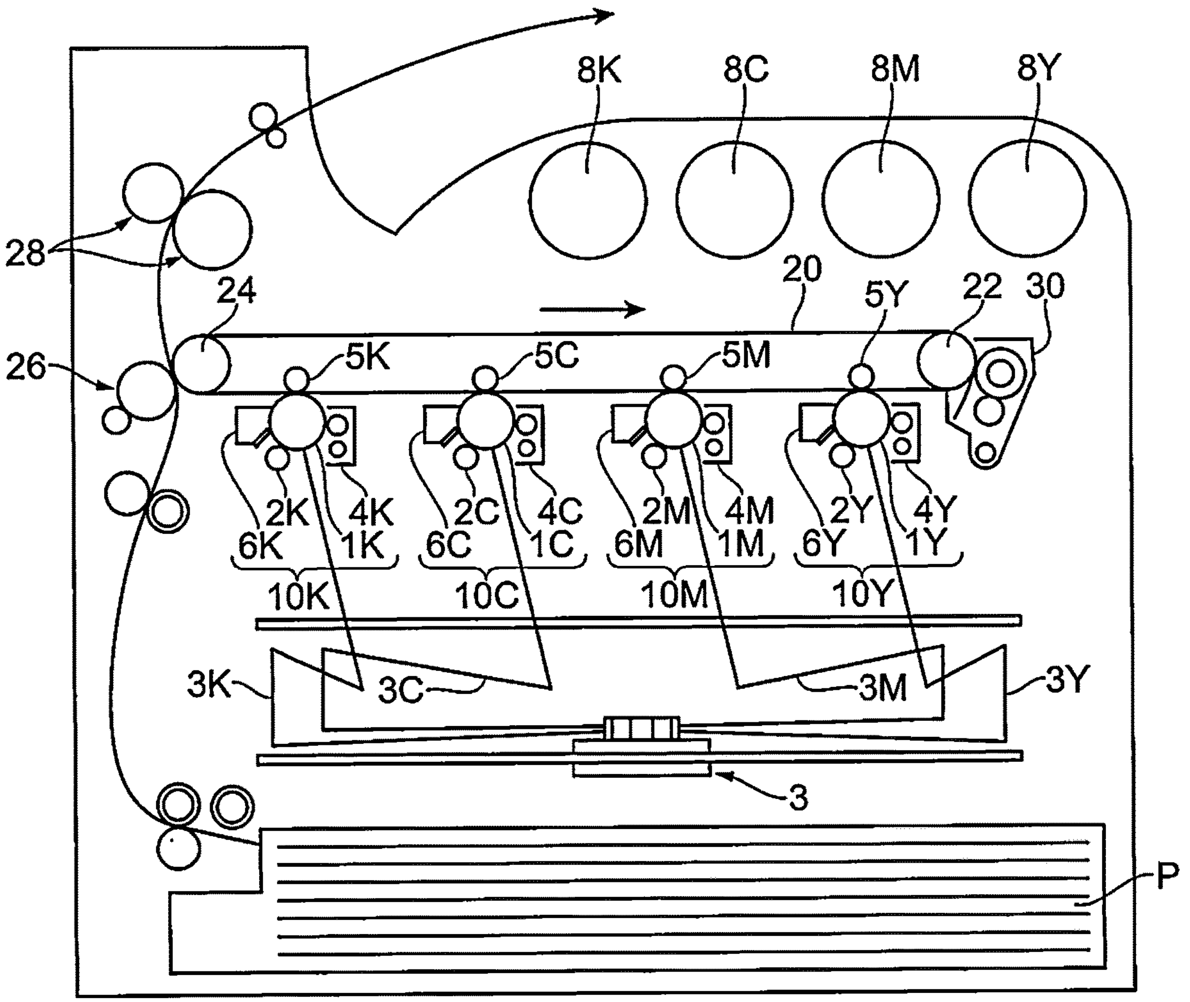
FIG. 1 is a schematic configuration diagram showing an example of an image forming apparatus according to the exemplary embodiment.

An exemplary embodiment of the disclosure will be described below. The description, Examples, etc. are illustrative of the exemplary embodiment and are not intended to limit the scope of the disclosure.

In the present disclosure, the phrases "from XXX to YYY inclusive" and "XXX to YYY" each mean a numerical range including the upper and lower limits specified, unless otherwise noted. In the present disclosure, when reference is made to the amount of a component in a composition, if the composition contains a plurality of materials corresponding to the component, the amount means the total amount of the plurality of materials, unless otherwise noted.

In the present disclosure, the "electrostatic image developer" may be referred to simply as the "developer," and the "carrier for electrostatic image development" may be referred to simply as the "carrier." The "toner for electrostatic image development" may be referred to simply as the "toner."

In the present specification, the characteristics of the silica particles are measured after the silica particles have been separated from the toner. No limitation is imposed on the method for separating the silica particles from the toner. For example, the following separation treatment is used to separate the silica particles from the toner, and the measurement is performed on the silica particles obtained.

—Separation Treatment—

2 g of the toner is dispersed in 50 g of a 0.2% by mass aqueous solution of Triton X-100 (manufactured by Sigma-Aldrich), and ultrasonic waves are applied to the dispersion using an ultrasonic homogenizer US-300T (manufactured by NIHONSEIKI KAISHA LTD.) for 30 minutes or longer under the conditions of 20° C. and 85 watts. Then the dispersion is subjected to high-speed centrifugation, and the supernatant is vacuum-dried at 80° C. to thereby obtain the silica particles.

<Electrostatic Image Developer>

An electrostatic image developer according to the present exemplary embodiment includes:

- toner particles;
- silica particles that are externally added to the toner particles and include an elemental nitrogen-containing compound containing elemental molybdenum and in which the ratio (Mo/Si) of the Net intensity of elemental molybdenum that is measured by X-ray fluorescence analysis to the Net intensity of elemental silicon in the silica particles that is measured by the X-ray fluorescence analysis is from 0.035 to 0.45 inclusive (these silica particles are hereinafter referred to also as "specific silica particles"); and
- a carrier having a relative dielectric loss factor of from 0.5 to 2.0 inclusive.

The developer according to the present exemplary embodiment includes the specific carrier and the specific silica particles externally added to the toner particles. In this case, the occurrence of white spots that tend to occur particularly under high-temperature high-humidity conditions can be reduced. The mechanism of this may be as follows.

Electric charge leakage between a charged toner and a charged carrier is likely to occur particularly in a high-temperature high-humidity external environment, and, in this case, the charged state may not be maintained at a high level. The relative dielectric loss factor of the carrier in the present exemplary embodiment is small, and this allows a highly charged state to be obtained and maintained. When an image with an extremely high image density is printed, it is necessary to increase an electric field during development. However, when the electric field is increased, local electrical discharge caused by the carrier is likely to occur between a magnetic brush and an image holding member. In this case, the toner is not transferred onto the discharge portions, and white spots may appear in the printed material.

The specific silica particles include the elemental nitrogen-containing compound containing elemental molybdenum. Positive charges originating from the elemental nitrogen and the high dielectricity mainly due to molybdenum prevent the amount of charges from increasing excessively and allow an appropriate amount of charges to be applied, so that the charged state of the developer is stabilized. It is therefore inferred that, by combining the specific silica particles and the carrier in the present exemplary embodiment that has a lower relative dielectric loss factor than general carriers, the specific silica particles can prevent electric charge leakage caused by the carrier.

The ionic radius of molybdenum is suitable for this effect, and no sufficient effect can be obtained using other metals. With other metals, the effect of reducing electric charge leakage cannot be obtained.

The toner according to the present exemplary embodiment will be described in detail.

The toner according to the present exemplary embodiment contains the toner particles and external additives.

(Toner Particles)

The toner particles contain a binder resin. The toner particles may optionally contain a coloring agent, a release agent, and additional additives.

—Binder Resin—

Examples of the binder resin include: vinyl resins composed of homopolymers of monomers such as styrenes (such as styrene, p-chlorostyrene, and $\alpha$-methylstyrene), (meth)acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene); and vinyl resins composed of copolymers of combinations of two or more of the above monomers.

Other examples of the binder resin include: non-vinyl resins such as epoxy resins, polyester resins, polyurethane resins, polyamide resins, cellulose resins, polyether resins, and modified rosins; mixtures of the non-vinyl resins and the above-described vinyl resins; and graft polymers obtained by polymerizing a vinyl monomer in the presence of any of these resins.

One of these binder resins may be used alone, or two or more of them may be used in combination.

The binder resin may be a polyester resin.

The polyester resin is, for example, a well-known polyester resin.

The polyester resin may be, for example, a polycondensation product of a polycarboxylic acid and a polyhydric alcohol. The polyester resin used may be a commercial product or a synthesized product.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acids, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower alkyl (e.g., having 1 to 5 carbon atoms) esters thereof. In particular, the polycarboxylic acid may be, for example, an aromatic dicarboxylic acid.

The polycarboxylic acid used may be a combination of a dicarboxylic acid and a tricarboxylic or higher polycarboxylic acid having a crosslinked or branched structure. Examples of the tricarboxylic or higher polycarboxylic acid include trimellitic acid, pyromellitic acid, anhydrides thereof, and lower alkyl (e.g., having 1 to 5 carbon atoms) esters thereof.

Any of these polycarboxylic acids may be used alone or in combination of two or more.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). In particular, the polyhydric alcohol is, for example, preferably an aromatic diol or an alicyclic diol and more preferably an aromatic diol.

The polyhydric alcohol used may be a combination of a diol and a trihydric or higher polyhydric alcohol having a crosslinked or branched structure. Examples of the trihydric or higher polyhydric alcohol include glycerin, trimethylolpropane, and pentaerythritol.

Any of these polyhydric alcohols may be used alone or in combination or two or more.

The glass transition temperature (Tg) of the polyester resin is preferably from 50° C. to 80° C. inclusive and more preferably from 50° C. to 65° C. inclusive.

The glass transition temperature is determined using a DSC curve obtained by differential scanning calorimetry (DSC). More specifically, the glass transition temperature is determined from "extrapolated glass transition onset temperature" described in a glass transition temperature determination method in "Testing methods for transition temperatures of plastics" in JIS K7121:1987.

The weight average molecular weight (Mw) of the polyester resin is preferably from 5,000 to 1,000,000 inclusive and more preferably from 7,000 to 500,000 inclusive. The number average molecular weight (Mn) of the polyester resin may be from 2,000 to 100,000 inclusive. The molecular weight distribution Mw/Mn of the polyester resin is preferably from 1.5 to 100 inclusive and more preferably from 2 to 60 inclusive.

The weight average molecular weight and number average molecular weight of the polyester resin are measured by gel permeation chromatography (GPC). In the molecular weight measurement by GPC, a GPC measurement apparatus HLC-8120GPC manufactured by TOSOH Corporation is used. A TSKgel Super HM-M (15 cm) column manufactured by TOSOH Corporation and a THF solvent are used. The weight average molecular weight and the number average molecular weight are computed from the measurement results using a molecular weight calibration curve produced using monodispersed polystyrene standard samples.

The polyester resin is obtained by a well-known production method. Specifically, the amorphous polyester resin is obtained, for example, by the following method. The polymerization temperature is set to from 180° C. to 230° C. inclusive. If necessary, the pressure inside the reaction system is reduced, and the reaction is allowed to proceed while water and alcohol generated during condensation are removed.

When the raw material monomers are not dissolved or not compatible with each other at the reaction temperature, a high-boiling point solvent may be added as a solubilizer to dissolve the monomers. In this case, the polycondensation reaction is performed while the solubilizer is removed by evaporation. When a monomer with poor compatibility is present in a copolymerization reaction, the monomer with poor compatibility and an acid or an alcohol to be polycondensed with the monomer are condensed in advance, and then the resulting polycondensation product and the rest of the components are subjected to polycondensation.

The content of the binder resin with respect to the total mass of the toner particles is, for example, preferably from 40% by mass to 95% by mass inclusive, more preferably from 50% by mass to 90% by mass inclusive, and still more preferably from 60% by mass to 85% by mass inclusive.

—Coloring Agent—

Examples of the coloring agent include: various pigments such as carbon black, chrome yellow, Hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and various dyes such as acridine-based dyes, xanthene-based dyes, azo-based dyes, benzoquinone-based dyes, azine-based dyes, anthraquinone-based dyes, thioindigo-based dyes, dioxazine-based dyes, thiazine-based dyes, azomethine-based dyes, indigo-based dyes, phthalocyanine-based dyes, aniline black-based dyes, polymethine-based dyes, triphenylmethane-based dyes, diphenylmethane-based dyes, and thiazole-based dyes.

One of these coloring agents may be used alone, or two or more of them may be used in combination.

The coloring agent used may be optionally subjected to surface treatment or may be used in combination with a dispersant. A plurality of coloring agents may be used in combination.

The content of the coloring agent with respect to the total mass of the toner particles is, for example, preferably from 1% by mass to 30% by mass inclusive and more preferably from 3% by mass to 15% by mass inclusive.

—Release Agent—

Examples of the release agent include: hydrocarbon-based waxes; natural waxes such as carnauba wax, rice wax, and candelilla wax; synthetic and mineral/petroleum-based waxes such as montan wax; and ester-based waxes such as fatty acid esters and montanic acid esters. The release agent used is not limited to the above release agents.

The melting temperature of the release agent is preferably from 50° C. to 110° C. inclusive and more preferably from 60° C. to 100° C. inclusive.

The melting temperature is determined using a DSC curve obtained by differential scanning calorimetry (DSC) from "peak melting temperature" described in melting temperature determination methods in "Testing methods for transition temperatures of plastics" in JIS K7121-1987.

The content of the release agent with respect to the total mass of the toner particles is preferably from 1% by mass to 20% by mass inclusive and more preferably from 5% by mass to 15% by mass inclusive.

—Additional Additives—

Examples of the additional additives include well-known additives such as a magnetic material, a charge control agent, and an inorganic powder. These additives are contained in the toner particles as internal additives.

—Characteristics Etc. Of Toner Particles—

The toner particles may have a single layer structure or may have a so-called core-shell structure including a core (core particle) and a coating layer (shell layer) covering the core.

Toner particles having the core-shell structure may each include, for example: a core containing a binder resin and optional additives such as a coloring agent and a release agent; and a coating layer containing a binder resin.

The volume average particle diameter (D50v) of the toner particles is preferably from 2 μm to 10 μm inclusive and more preferably from 4 μm to 8 μm inclusive.

Average particle diameters and particle size distribution indexes of the toner particles are measured using Coulter Multisizer II (manufactured by Beckman Coulter, Inc.), and ISOTON-II (manufactured by Beckman Coulter, Inc.) is used as an electrolyte.

In the measurement, 0.5 mg to 50 mg of a measurement sample is added to 2 mL of a 5% aqueous solution of a surfactant (which may be sodium alkylbenzenesulfonate) serving as a dispersant. The mixture is added to 100 mL to 150 mL of the electrolyte.

The electrolyte with the sample suspended therein is subjected to dispersion treatment for 1 minute using an ultrasonic dispersion apparatus, and then the particle size distribution of particles having diameters within the range of 2 μm to 60 μm is measured using an aperture having an aperture diameter of 100 μm in the Coulter Multisizer II. The number of particles sampled is 50000.

The particle size distribution measured and divided into particle size ranges (channels) is used to obtain volume-based and number-based cumulative distributions computed from the small diameter side. In the computed volume-based cumulative distribution, the particle diameter at a cumulative frequency of 16% is defined as a volume-based particle diameter D16v, and the particle diameter at a cumulative frequency of 50% is defined as a volume average particle diameter D50v. The particle diameter at a cumulative frequency of 84% is defined as a volume-based particle diameter D84v. In the number-based cumulative distribution, the particle diameter at a cumulative frequency of 16% is defined as a number-based particle diameter D16p, and the particle diameter at a cumulative frequency of 50% is defined as a number average cumulative particle diameter D50p. Moreover, the particle diameter at a cumulative frequency of 84% is defined as a number-based particle diameter D84p.

These are used to compute a volume-based particle size distribution index (GSDv) defined as $(D84v/D16v)^{1/2}$ and a number-based particle size distribution index (GSDp) defined as $(D84p/D16p)^{1/2}$.

The average circularity of the toner particles is preferably from 0.950 to 0.990 inclusive and more preferably from 0.957 to 0.980 inclusive.

The average circularity of the toner particles is measured using FPIA-3000 manufactured by Sysmex. In this apparatus, the particles dispersed in, for example, water are subjected to measurement using a flow-type image analysis method. The particle suspension is sucked and introduced into a flat sheath flow cell, and a sheath liquid is used to form a flattened sample flow. The sample flow is irradiated with strobe light, and images of the particles passing through the flow cell are captured through an objective lens by a CCD (Charge Coupled Device) camera as still images. The captured particle images are subjected to two-dimensional image processing, and the circularity of each particle is computed from its projected area and perimeter. As for the circularity, at least 4,000 particles are subjected to image analysis and statistical processing to determine the average circularity.

$$\text{circularity}=\text{equivalent circle diameter perimeter}/\text{perimeter}=[2\times(A\pi)^{1/2}]/PM \qquad \text{Formula:}$$

In the above formula, A represents the projected area, and PM represents the perimeter.

In the measurement, an HPF (high resolution) mode is used, and the dilution ratio is 1.0. In the data analysis, the range of the circularity analysis is from 0.40 to 1.00 inclusive for the purpose of removing noise in the measurement.

(External Additives)

The external additives externally added to the toner particles include the specific silica particles.

The specific silica particles include the elemental nitrogen-containing compound containing elemental molybdenum, and the ratio (Mo/Si) of the Net intensity of elemental molybdenum measured by X-ray fluorescence analysis to the Net intensity of elemental silicon in the silica particles measured by the X-ray fluorescence analysis is from 0.035 to 0.45 inclusive.

—Elemental Nitrogen-Containing Compound Containing Elemental Molybdenum—

The specific silica particles include the elemental nitrogen-containing compound, and the elemental nitrogen-containing compound further contains elemental molybdenum. As described later, the elemental nitrogen-containing compound may be adsorbed on at least part of pores in a reaction product of a trifunctional silane coupling agent.

From the viewpoint of narrowing the charge distribution on the silica particles to thereby reduce image unevenness and scattering of the toner, the elemental nitrogen-containing compound containing elemental molybdenum may be at least one selected from the group consisting of quaternary ammonium salts containing elemental molybdenum (particularly elemental molybdenum-containing quaternary ammonium salts) and mixtures of quaternary ammonium salts and metal oxides containing elemental molybdenum.

When the elemental nitrogen-containing compound contains elemental molybdenum, the activity of the elemental nitrogen increases. In this case, even when the elemental nitrogen-containing compound is present not on the outermost surfaces of the silica particles but inside the pores, the elemental nitrogen can exhibit its positive chargeability appropriately. Therefore, when the toner is charged, its charge distribution is narrowed, and the retainability of the charge distribution tends to be high. This allows the image unevenness to be easily reduced and the scattering of the toner to be easily reduced. When the toner particles are used in combination with the carrier described later, the amount of electric charge leakage can be reduced, and the occurrence of white spots during printing can also be reduced.

In particular, in an elemental molybdenum-containing quaternary ammonium salt, an anion, i.e., a negative ion, containing elemental molybdenum is strongly bonded to a quaternary ammonium cation, i.e., a positive ion, so that the retainability of the charge distribution is enhanced. Therefore, the reduction in the image unevenness and the reduction in the scattering of the toner can be easily achieved.

Examples of the quaternary ammonium salt containing elemental molybdenum include $[N^+(CH)_3(C1_4C_{29})_2]_4Mo_8O_{28}^{4-}$, $[N^+(C_4H_9)_2(C_6H_6)_2]_2Mo_2O_7^{2-}$, $[N^+(CH_3)_2(CH_2C_6H_6)(CH_2)_{17}CH_3]_2MoO_4^{2-}$, and $[N^+(CH_3)_2(CH_2C_6H_6)(CH_2)_{15}CH_3]_2MoO_4^{2-}$.

Examples of the metal oxide containing elemental molybdenum include molybdenum oxides (molybdenum trioxide, molybdenum dioxide, and $Mo_9O_{26}$), alkali metal molybdates (such as lithium molybdate, sodium molybdate, and potassium molybdate), alkaline-earth metal molybdates (such as magnesium molybdate and calcium molybdate), and other complex oxides (such as $Bi_2O_3\cdot 2MoO_3$ and $\gamma\text{-}Ce_2Mo_3O_{13}$).

When the elemental nitrogen-containing compound used is an elemental nitrogen-containing compound containing elemental molybdenum, the ratio (Mo/Si) of the Net intensity of elemental molybdenum measured by X-ray fluorescence analysis to the Net intensity of elemental silicon measured by the X-ray fluorescence analysis is from 0.035 to 0.45 inclusive, from the viewpoint of narrowing the charge distribution on the silica particles under specific conditions to thereby reduce the image unevenness and the scattering of the toner and from the viewpoint of reducing the amount of electric charge leakage to thereby control white spots. This ratio is preferably from 0.07 to 0.32 inclusive and more preferably from 0.10 to 0.30 inclusive.

From the viewpoint of narrowing the charge distribution on the silica particles under the specific conditions to thereby reduce the image unevenness and the scattering of the toner, the Net intensity of elemental molybdenum is preferably from 5 kcps to 75 kcps inclusive, from 7 kcps to 50 kcps inclusive, from 8 kcps to 55 kcps inclusive, or from 10 kcps to 40 kcps inclusive.

The Net intensity of elemental molybdenum and the Net intensity of elemental silicon are measured by the following method.

About 0.5 g of the silica particles are compressed under a load of 6 t for 60 seconds using a compression molding machine to produce a disk with a diameter of 50 mm and a thickness of 2 mm. This disk is used as a sample, and qualitative and quantitative elemental analysis is performed under the following conditions using a scanning X-ray fluorescence analyzer (XRF-1500 manufactured by Shimadzu Corporation) to thereby determine the Net intensity of elemental molybdenum and the Net intensity of elemental silicon (unit: kilo counts per second, kcps).

Tube voltage: 40 kV

Tube current: 90 mA

Measurement area (analysis diameter): diameter 10 mm ϕ

Measurement time: 30 minutes

Anticathode: rhodium

—Detection of Elemental Nitrogen-Containing Compound and Content Thereof—

When the specific silica particles are heated in a temperature range of from 300° C. to 600° C. inclusive, the elemental nitrogen-containing compound is detected. Specifically, for example, the following is performed.

To detect the elemental nitrogen-containing compound, for example, a drop-type pyrolysis gas chromatography mass spectrometer of the heating furnace type is used with He used as a carrier gas. The elemental nitrogen-containing compound containing elemental molybdenum can be detected under the pyrolysis temperature condition of from 300° C. to 600° C. inclusive in an inert gas. Specifically, the silica particles in an amount of from 0.1 mg to 10 mg inclusive are introduced into the pyrolysis gas chromatography mass spectrometer, and the presence or absence of the elemental nitrogen-containing compound containing elemental molybdenum is checked from the detected MS spectrum including peaks.

From the viewpoint of narrowing the charge distribution on the silica particles to thereby reduce the image unevenness and the scattering of the toner, the content of the elemental nitrogen-containing compound containing elemental molybdenum in terms of elemental nitrogen with respect to the mass of the silica particles is from 0.005% by mass to 0.5% by mass inclusive. The content is preferably from 0.05% by mass to 0.4% by mass inclusive and more preferably from 0.1% by mass to 0.3% by mass inclusive.

The content of the elemental nitrogen-containing compound containing elemental molybdenum in terms of elemental nitrogen is measured as follows.

An oxygen-nitrogen analyzer (for example, EMGA-920 manufactured by HORIBA Ltd.) is used for the measurement for a cumulative time of 45 seconds to obtain the amount of elemental nitrogen present and the ratio of N (N/Si). The sample is subjected to pre-treatment, i.e., is dried in a vacuum dryer, at 100° C. for 24 hours or longer to remove impurities such as ammonia from the silica particles.

—Extracted Amount of Elemental Nitrogen-Containing Compound Containing Elemental Molybdenum—

The extracted amount X of the elemental nitrogen-containing compound containing elemental molybdenum extracted with an ammonia/methanol solution mixture is 0.1% by mass or more with respect to 100% by mass of the silica particles. The extracted amount X of the elemental nitrogen-containing compound and the extracted amount Y of the elemental nitrogen-containing compound extracted with water (in terms of % by mass with respect to 100% by mass of the silica particles, as is X) may satisfy the formula $Y/X<0.3$.

Specifically, the elemental nitrogen-containing compound containing elemental molybdenum does not readily dissolve in water, i.e., does not readily adsorb moisture in air In the silica particles including the elemental nitrogen-containing compound containing elemental molybdenum, when the compound adsorbs moisture, the charge distribution is broadened, and the elemental nitrogen-containing compound containing elemental molybdenum is easily separated from the silica particles.

However, in the silica particles including the elemental nitrogen-containing compound containing elemental molybdenum that does not readily adsorb moisture in air, the charge distribution is unlikely to be broadened even when a large amount of moisture is present in air (even at high humidity), and the elemental nitrogen-containing compound is unlikely to be separated, so that the narrow charge distribution is easily maintained. Therefore, the reduction in the image unevenness and in the scattering of the toner due to the narrowing of the charge distribution on the silica particles under the specific conditions can be easily achieved.

The extracted amount X of the elemental nitrogen-containing compound containing elemental molybdenum with respect to 100% by mass of the silica particles may be 0.25% by mass or more. However, the upper limit of the extracted amount X of the elemental nitrogen-containing compound containing elemental molybdenum is, for example, 6.5% by mass or less because the solution does not readily penetrate into the pores due to its surface tension and part of the elemental nitrogen-containing compound containing elemental molybdenum remains undissolved.

The ratio "Y/X" of the extracted amount Y of the elemental nitrogen-containing compound containing elemental molybdenum to its extracted amount X is preferably less than 0.3 and more preferably 0.15 or less. The lower limit of the ratio "Y/X" is ideally 0. However, since the measurement errors for X and Y are about ±1%, the lower limit is, for example, 0.01 or more.

The extracted amounts X and Y of the elemental nitrogen-containing compound containing elemental molybdenum are measured as follows.

The silica particles used for the measurement are analyzed using a thermogravimetry mass spectrometer (for example, a gas chromatography mass spectrometer manufactured by NETZSCH Japan K.K.) at a constant temperature of 400° C. The cumulative mass percentage of compounds in which nitrogen atoms and hydrocarbons having one or more carbon atoms are bonded through covalent bonds with respect to the silica particles is measured and used as W1.

One part by mass of the silica particles used for the measurement are added to 30 parts by mass of an ammonia/methanol solution (manufactured by Sigma-Aldrich, ammonia/methanol mass ratio=1/5.2) with a solution temperature of 25° C. The mixture is subjected to ultrasonic treatment for 30 minutes, and then the silica powder and the extract are separated from each other. The separated silica particles are dried in a vacuum dryer at 100° C. for 24 hours, and the mass percentage of the compounds in which nitrogen atoms and hydrocarbons having one or more carbon atoms are bonded through covalent bonds with respect to the silica particles is measured using the thermogravimetry mass spectrometer under a constant condition of 400° C. and used as W2.

The extracted amount X of the elemental nitrogen-containing compound is computed using the following formula.

$$X=W1-W2 \qquad \text{Formula:}$$

One part by mass of the silica particles used for the measurement are added to 30 parts by mass of water with a solution temperature of 25° C. The mixture is subjected to ultrasonic treatment for 30 minutes, and then the silica powder and the extract are separated from each other. The separated silica particles are dried in a vacuum dryer at 100° C. for 24 hours, and the mass percentage of the compounds in which nitrogen atoms and hydrocarbons having one or more carbon atoms are bonded through covalent bonds with respect to the silica particles is measured using the thermogravimetry mass spectrometer under a constant condition of 400° C. and used as W3.

The following formula is used to compute the extracted amount Y of the elemental nitrogen-containing compound containing elemental molybdenum.

$$Y=W1-W3. \qquad \text{Formula:}$$

—Pore Volume—

In the specific silica particles, the pore volumes in a pore diameter range of from 1 nm to 50 nm inclusive before and after firing at 350° C. are determined from pore distribution curves obtained by a nitrogen gas adsorption method and are denoted as A and B, respectively. Then B/A is from 1.2 to 5 inclusive, and B may be from 0.2 $cm^3/g$ to 3 $cm^3/g$ inclusive.

In the specific silica particles, the ratio B/A of the pore volume B after firing at 350° C. to the pore volume A before firing at 350° C. may be from 1.2 to 5 inclusive. If the ratio B/A is excessively small, the elemental nitrogen-containing compound is easily separated, and the charge retention effect tends not to be obtained. If the ratio B/A is excessively large, the elemental nitrogen-containing compound penetrates excessively deep inside the silica particles. In this case, electrostatic repulsion is insufficient, so that the adhesion reduction effect tends to be insufficient. From the above point of view, the ratio B/A is more preferably from 1.5 to 4.5 inclusive and still more preferably from 2.5 to 3.5 inclusive.

The pore volume B after firing at 350° C. may be from 0.2 $cm^3/g$ to 3 $cm^3/g$ inclusive. If the pore volume B is excessively small, the elemental nitrogen-containing compound is easily separated, and the charge retention effect tends not to be obtained. If the pore volume B is excessively large, the elemental nitrogen-containing compound penetrates excessively deep inside the silica particles. In this case, electrostatic repulsion is insufficient, so that the adhesion reduction effect tends to be insufficient. From the above point of view, the pore volume B is more preferably from 0.5 $cm^3/g$ to 2.5 $cm^3/g$ inclusive and still more preferably from 1.0 $cm^3/g$ to 2.0 $cm^3/g$ inclusive.

From the viewpoint of the ease of impregnation with elemental nitrogen and the maintenance of an appropriate electrostatic repulsion effect, the pore volume A after firing at 350° C. is preferably from 0.1 $cm^3/g$ to 0.9 $cm^3/g$ inclusive, more preferably from 0.3 $cm^3/g$ to 0.7 $cm^3/g$ inclusive, and still more preferably from 0.4 $cm^3/g$ to 0.6 $cm^3/g$ inclusive.

Specifically, the firing at 350° C. is performed as follows.

The silica particles used for the measurement are heated to 350° C. in a nitrogen environment at a heating rate of 10° C./minute and held at 350° C. for 3 hours. Then the silica particles are cooled to room temperature (25° C.) at a cooling rate of 10° C./minute.

The pore volume is measured as follows.

First, the silica particles used for the measurement are cooled to liquid nitrogen temperature (−196° C.), and nitrogen gas is introduced to determine the adsorption amount of the nitrogen gas by the constant volume method or gravimetric method. The pressure of the nitrogen gas introduced is gradually increased, and the amount of the nitrogen gas adsorbed is plotted against the equilibrium pressure to produce an adsorption isotherm. A pore diameter distribution curve with the vertical axis representing the frequency and the horizontal axis representing the pore diameter is determined from the adsorption isotherm according to the calculation formula of the BJH method.

Then a cumulative pore volume distribution with the vertical axis representing the volume and the horizontal axis representing the pore diameter is determined from the obtained pore diameter distribution curve. The pore volume in the pore diameter range of from 1 nm to 50 nm inclusive in the obtained cumulative pore volume distribution is integrated, and the integrated value is used as the "pore volume in the pore diameter range of from 1 nm to 50 nm inclusive."

—CP/MAS NMR Spectrum—

In a Si-CP/MAS NMR spectrum of the specific silica particles, the ratio C/D of the integrated value C of a signal observed in a chemical shift range of from −50 ppm to −75 ppm inclusive to the integrated value D of a signal observed in a chemical shift range of from −90 ppm to −120 ppm inclusive is preferably from 0.10 to 0.75 inclusive. From the viewpoint of narrowing the charge distribution on the silica particles to thereby reduce the image unevenness and the scattering of the toner, the ratio C/D is more preferably from 0.12 to 0.45 inclusive and still more preferably from 0.15 to 0.40 inclusive.

From the viewpoint of narrowing the charge distribution on the silica particles and reducing the image unevenness, the ratio (signal ratio) of the integrated value C of the signal observed in the chemical shift range of from −50 ppm to −75 ppm inclusive is preferably 5% or more and more preferably 7% or more, with the integrated value of the signal in the entire range in the Si-CP/MAS NMR spectrum set to 100%. The upper limit of the ratio of the integrated value C of the signal is, for example, 60% or less.

The Si-CP/MAS NMR spectrum is obtained by performing the measurement by nuclear magnetic resonance spectrometric analysis under the following conditions.

Spectroscope: AVANCE 300 (manufactured by Bruker)

Resonance frequency: 59.6 MHz

Measurement nucleus: $^{29}Si$

Measurement method: CPMAS method (using standard pulse sequence cp.av from Bruker)

Waiting time: 4 seconds

Contact time: 8 milliseconds

Number of scans: 2048

Measurement temperature: room temperature (measured value: 25° C.)

Observation center frequency: −3975.72 Hz
MAS spinning rate: 7.0 mm-6 kHz
Reference material: hexamethylcyclotrisiloxane —Structure of Silica Particles—

The specific silica particles include the elemental nitrogen-containing compound containing elemental molybdenum.

Specific examples of the structure of the specific silica particles include a structure that includes silica base particles, in which at least part of the surfaces of the silica base particles are covered with the reaction product of the trifunctional silane coupling agent, and in which the elemental nitrogen-containing compound containing elemental molybdenum is adsorbed on at least part of the reaction product. By forming the above structure, the pore volume characteristics and the Si-CP/MASNMR spectrum characteristics can be controlled. The hydrophobicity and the number of OH groups described later can also be controlled.

The specific silica particles may have a hydrophobic-treated structure on the surface of the structure described above.

—Silica Base Particles—

The silica base particles are silica particles in which at least part of their surfaces are formed from the reaction product of the trifunctional silane coupling agent and in which a structure on which the elemental nitrogen-containing compound is adsorbed is to be formed in at least part of the pores in the reaction product of the trifunctional silane coupling agent.

The silica base particles may be dry silica particles or may be wet silica particles.

Examples of the dry silica particles include: combustion method silica (fumed silica) particles obtained by combusting a silane compound; and deflagration method silica particles obtained by explosively combusting a metal silicon powder.

Examples of the wet silica particles include: wet silica particles obtained through a neutralization reaction of sodium silicate and a mineral acid (precipitated silica particles synthesized and aggregated under alkaline conditions and gel method silica particles synthesized and aggregated under acidic conditions); colloidal silica particles (silica sol particles) obtained by alkalifying and polymerizing acidic silicate; and sol-gel method silica particles obtained by hydrolysis of an organic silane compound (e.g., alkoxysilane).

From the viewpoint of narrowing the charge distribution on the silica particles to thereby reduce the image unevenness and the scattering of the toner, the silica base particles may be sol-gel method silica particles.

—Reaction Product of Trifunctional Silane Coupling Agent—

The adsorption structure formed from the reaction product of the trifunctional silane coupling agent is a low-density structure that has a high affinity for the elemental nitrogen-containing compound. Therefore, the elemental nitrogen-containing compound can easily adsorb on deep portions of the pores, and the adsorption amount of the elemental nitrogen-containing compound (i.e., its content) is high. Since the elemental nitrogen-containing compound having positive chargeability is adsorbed on the surface of the silica having negative chargeability, the effect of canceling excessive negative charges is generated. Since the elemental nitrogen-containing compound is adsorbed not on the outermost surfaces of the silica particles but on the inside of the low-density structure, broadening of the charge distribution due to excessively high positive chargeability is prevented. Since only excessive negative charges are cancelled, the charge distribution is further narrowed. Therefore, the reduction in the image unevenness and in the scattering of the toner due to the narrowing of the charge distribution on the silica particles under the specific conditions can be achieved more easily.

Examples of the reaction product of the trifunctional silane coupling agent include: a reaction product in which $OR^2$s in general formula (TA) below are replaced with OH groups; a reaction product in which moieties with $OR^2$s replaced with OH groups are polycondensed; and a reaction product in which moieties with $OR^2$s replaced with OH groups and SiOH groups in the silica particles are polycondensed. In the reaction product of the trifunctional silane coupling agent, all or part of $OR^2$s may be replaced, and all or part of $OR^2$s may be polycondensed.

The trifunctional silane coupling agent is a non-elemental nitrogen-containing compound containing no N (nitrogen).

Specifically, the trifunctional silane coupling agent may be a trifunctional silane coupling agent represented by general formula (TA) below.

$$R^1\text{—}Si(OR^2)_3 \qquad \text{General formula (TA):}$$

In general formula (TA), $R^1$ represents a saturated or unsaturated aliphatic hydrocarbon group having 1 to 20 carbon atoms or an aromatic hydrocarbon group having 6 to 20 carbon atoms, and $R^2$ represents a halogen atom or an alkyl group. The plurality of Res may be the same group or different groups.

The aliphatic hydrocarbon group represented by $R^1$ may be linear, branched, or cyclic and is preferably linear or branched. The number of carbon atoms in the aliphatic hydrocarbon group is preferably from 1 to 20 inclusive, more preferably from 1 to 18 inclusive, still more preferably from 1 to 12 inclusive, and yet more preferably from 1 to 10 inclusive. The aliphatic hydrocarbon group may be saturated or unsaturated and is preferably a saturated aliphatic hydrocarbon group and more preferably an alkyl group.

Examples of the saturated aliphatic hydrocarbon group include: linear alkyl groups (such as a methyl group, an ethyl group, a propyl group, a butyl group, a pentyl group, a hexyl group, a heptyl group, an octyl group, a nonyl group, a decyl group, a dodecyl group, a hexadecyl group, and an icosyl group); branched alkyl groups (such as an isopropyl group, an isobutyl group, an isopentyl group, a neopentyl group, a 2-ethylhexyl group, a tert-butyl group, a tert-pentyl group, and an isopentadecyl group); and cyclic alkyl groups (such as a cyclopropyl group, a cyclopentyl group, a cyclohexyl group, a cycloheptyl group, a cyclooctyl group, a tricyclodecyl group, a norbornyl group, and an adamantyl group).

Examples of the unsaturated aliphatic hydrocarbon group include: alkenyl groups (such as a vinyl group (ethenyl group), a 1-propenyl group, a 2-propenyl group, a 2-butenyl group, a 1-butenyl group, a 1-hexenyl group, a 2-dodecenyl group, and a pentenyl group); and alkynyl groups (such as an ethynyl group, a 1-propynyl group, a 2-propynyl group, a 1-butynyl group, a 3-hexynyl group, and a 2-dodecynyl group).

The number of carbon atoms in the aromatic hydrocarbon group represented by $R^1$ is preferably from 6 to 20 inclusive, more preferably from 6 to 18 inclusive, still more preferably from 6 to 12 inclusive, and yet more preferably from 6 to 10 inclusive.

Examples of the aromatic hydrocarbon group include a phenylene group, a biphenylene group, a terphenylene group, a naphthalene group, and an anthracene group.

Examples of the halogen atom represented by $R^2$ include a fluorine atom, a chlorine atom, a bromine atom, and an iodine atom. The halogen atom may be a chlorine atom, a bromine atom, or an iodine atom.

Examples of the alkoxy group represented by $R^2$ include alkoxy groups having 1 to 10 carbon atoms (preferably 1 to 8 carbon atoms and more preferably 1 to 4 carbon atoms). Examples of the alkoxy group include a methoxy group, an ethoxy group, an isopropoxy group, a t-butoxy group, a n-butoxy group, a n-hexyloxy group, a 2-ethylhexyloxy group, and a 3,5,5-trimethylhexyloxy group. The alkoxy group may be a substituted alkoxy group. Examples of the substitute usable for the substituted alkoxy group include halogen atoms, a hydroxy group, an amino group, alkoxy groups, an amido group, and a carbonyl group.

The trifunctional silane coupling agent represented by general formula (TA) may be a trifunctional silane coupling agent with $R^1$ being a saturated aliphatic hydrocarbon group having 1 to 20 carbon atoms and $R^2$ being a halogen atom or an alkoxy group.

Examples of the trifunctional silane coupling agent include:

- vinyltrimethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, and phenyltrichlorosilane (these are compounds with $R^1$ being an unsubstituted aliphatic hydrocarbon group or an unsubstituted aromatic hydrocarbon group); and
- 3-glycidoxypropyltrimethoxysilane, γ-methacryloxypropyltrimethoxysilane, γ-mercaptopropyltrimethoxysilane, γ-chloropropyltrimethoxysilane, and γ-glycidyloxypropylmethyldimethoxysilane (these are compound with $R^1$ being a substituted aliphatic hydrocarbon group or a substituted aromatic hydrocarbon group).

One of these trifunctional silane coupling agents may be used alone, or two or more of them may be used in combination.

In particular, from the viewpoint of narrowing the charge distribution on the silica particles to thereby reduce the image unevenness and the scattering of the toner, the trifunctional silane coupling agent is preferably an alkyltrialkoxysilane and more preferably an alkyltrialkoxysilane with $R^1$ in general formula (TA) being an alkyl group having 1 to 20 carbon atoms (preferably 1 to 15 carbon atoms) and $R^2$ being an alkyl group having 1 to 2 carbon atoms.

From the viewpoint of narrowing the charge distribution on the silica particles under the specific conditions to thereby reduce the image unevenness and the scattering of the toner, the adhesion amount of the reaction product of the trifunctional silane coupling agent with respect to the mass of the silica particles is preferably from 5.5% by mass to 30% by mass inclusive and more preferably from 7% by mass to 22% by mass inclusive.

The elemental nitrogen-containing compound containing elemental molybdenum may be adsorbed on at least part of the pores in the reaction product of the trifunctional silane coupling agent.

(Hydrophobic-Treated Structure)

The hydrophobic-treated structure is a structure reacted with a hydrophobizing agent.

The hydrophobizing agent used may be an organic silicon compound.

Examples of the organic silicon compound include:

- alkoxysilane compounds and halosilane compounds each having a lower alkyl group such as methyltrimethoxysilane, dimethyldimethoxysilane, trimethylchlorosilane, and trimethylmethoxysilane;
- alkoxysilane compounds each having a vinyl group such as vinyltrimethoxysilane and vinyltriethoxysilane;
- alkoxysilane compounds each having an epoxy group such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane;
- alkoxysilane compounds each having a styryl group such as p-styryltrimethoxysilane and p-styryltriethoxysilane;
- alkoxysilane compounds each having an aminoalkyl group such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxy silane, 3-triethoxy silyl-N-(1, 3-dimethyl-butylidene)propylamine, and N-phenyl-3-aminopropyltrimethoxysilane;
- alkoxysilane compounds each having an isocyanatoalkyl group such as 3-isocyanatopropyltrimethoxysilane and 3-isocyanatopropyltriethoxysilane; and
- silazane compounds such as hexamethyldisilazane and tetramethyldisilazane.

(Characteristics of Silica Particles)

—Hydrophobicity—

The hydrophobicity of the specific silica particles is preferably from 10% to 60% inclusive, more preferably from 20% to 55% inclusive, and still more preferably from 28% to 53% inclusive, from the viewpoint of narrowing the charge distribution on the silica particles under the specific conditions to thereby reduce the image unevenness and the scattering of the toner.

If the hydrophobicity of the silica particles is 10% or less, the coverage with the structure formed by the reaction of the trifunctional silane coupling agent is low, and the content of the elemental nitrogen-containing compound is low, so that the charge distribution tends to be broadened.

If the hydrophobicity of the silica particles exceeds 60%, the density of the structure formed by the reaction of the trifunctional silane coupling agent is high. In this case, the number of pores is small, and the content of the elemental nitrogen-containing compound is low. Therefore, the reduction in the image unevenness and in the scattering of the toner due to the narrowing of the charge distribution on the silica particles cannot be easily achieved.

The hydrophobicity of the silica particles is measured as follows.

The silica particles used as a specimen are added to 50 mL of ion exchanged water in an amount of 0.2% by mass. While the mixture is stirred using a magnetic stirrer, methanol is added dropwise from a burette, and the mass percentage of methanol in the methanol-water solution mixture at the endpoint at which the entire sample has sunk is determined as the hydrophobicity.

—Number Average Particle Diameter and Number-Based Particle Size Distribution Index—

The number average particle diameter of the specific silica particles is preferably from 10 nm to 100 nm inclusive, more preferably from 10 nm to 80 nm inclusive, and still more preferably from 10 nm to 70 nm inclusive.

When the number average particle diameter of the silica particles is within the above range, the silica particles are in good contact with the carrier, and the electric charge leakage is appropriately controlled, so that the occurrence of white spots is reduced. (If the number average particle diameter is less than 10 nm, the silica particles are easily embedded in the toner surface and other external additives, and the effects of the silica particles are unlikely to be obtained. If the number average particle diameter is larger than 100 nm, the silica particles are unlikely to be held on the toner, and the effects of the silica particles are unlikely to be obtained.)

The number-based particle size distribution index of the specific silica particles is preferably from 1.1 to 2.0 inclusive and more preferably from 1.15 to 1.6 inclusive.

When the number-based particle size distribution index of the specific silica particles is within the above range, the amount of coarse powder that tends to increase the charge amount and the amount of fine powder that tends to reduce the charge amount are small, so that the charge distribution is more likely to be narrowed. Therefore, the reduction in the image unevenness and in the scattering of the toner due to the narrowing of the charge distribution on the silica particles can be easily achieved.

The number average particle diameter and number-based particle size distribution index of the silica particles are measured as follows.

The silica particles are observed under a scanning electron microscope (SEM) at 40,000×. The images of the observed silica particles are analyzed using image processing analyzer software WinRoof (manufactured by MITANI CORPORATION), and equivalent circle diameters of at least 200 particles are determined. A cumulative number distribution of the particles is drawn from the small diameter side, and the particle diameter at a cumulative frequency of 50% from the small diameter side is determined as the number average particle diameter.

The square root of a value obtained by dividing a particle diameter D84 at a cumulative frequency of 84% from the small diameter side by a particle diameter D16 at a cumulative frequency of 16% is defined as the "number-based particle size distribution index" (GSD). Specifically, the number-based particle size distribution index (GSD) is $(D84/D16)^{0.5}$.

—Circularity—

The average circularity of the specific silica particles is preferably from 0.60 to 0.96 inclusive, more preferably from 0.70 to 0.92 inclusive, and still more preferably from 0.75 to 0.90 inclusive.

When the average circularity of the silica particles is within the above range, the specific surface area is large, and the amount charges tends to be excessively large. However, even when the average circularity of the specific silica particles is within the above range, the charge distribution is narrowed. Therefore, even when the average circularity of the specific silica particles is within the above range, the reduction in the image unevenness and in the scattering of the toner due to the narrowing of the charge distribution on the silica particles can be easily achieved.

The circularity of the silica particles is measured as follows.

The silica particles are observed under a scanning electron microscope (SEM) at 40,000×. The images of the observed silica particles are analyzed using image processing analyzer software WinRoof (manufactured by MITANI CORPORATION). The circularities of at least 200 particles are determined, and the arithmetic mean is determined to compute the average circularity.

The circularity is computed using the following formula.

$$\text{Circularity}=\text{equivalent circle diameter perimeter}/\text{perimeter}=[2\times(A\pi)^{1/2}]/PM$$

In the above formula, A represents the projected area, and PM represents the perimeter.

—Volume Resistivity—

The volume resistivity of the specific silica particles (i.e., the volume resistivity after firing at 350° C.) is preferably from $1.0\times10^{7}$ Ωcm to $1.0\times10^{11.5}$ Ωcm inclusive and more preferably from $1.0\times10^{8}$ Ωcm to $1.0\times10^{11}$ Ωcm inclusive.

When the volume resistivity of the specific silica particles is within the above range, the content of the elemental nitrogen-containing compound is large, and the amount of charges tends not to be excessively large, so that the charge distribution can be easily narrowed. Therefore, the reduction in the image unevenness and in the scattering of the toner due to the narrowing of the charge distribution on the silica particles under the specific conditions can be easily achieved.

Let the volume resistivities of the specific silica particles before and after firing at 350° C. be Ra and Rb, respectively. Then Ra/Rb is preferably from 0.01 to 0.8 inclusive and more preferably from 0.015 to 0.6 inclusive.

When Ra/Rb is within the above range, the content of the elemental nitrogen-containing compound is large, and the amount of charges tends not be excessively large, so that the charge distribution can be easily narrowed. Therefore, the reduction in the image unevenness and in the scattering of the toner due to the narrowing of the charge distribution on the silica particles can be easily achieved.

The firing at 350° C. is performed as described above.

The volume resistivity is measured as follows. In the measurement environment, the temperature is 20° C., and the humidity is 50% RH.

The silica particles used for the measurement are placed to a thickness of about 1 mm to about 3 mm inclusive on a surface of a circular jig with a 20 $cm^2$ electrode plate placed thereon to form a silica particle layer. A 20 $cm^2$ electrode plate similar to the above-described electrode plate is placed on the silica particle layer to sandwich the silica particle layer between the electrode plates, and a pressure of 0.4 MPa is applied to the electrode plate placed on the silica particle layer to eliminate air gaps between the silica particles. Then the thickness (cm) of the silica particle layer is measured. An impedance analyzer (manufactured by Solartron Analytical) connected to the electrodes on the upper and lower sides of the silica particle layer is used for the measurement in the frequency range of from $10^{-3}$ Hz to $10^{6}$ Hz inclusive, and a Nyquist plot is obtained. The results are fitted to an equivalent circuit on the assumption that there are three resistance components, i.e., bulk resistance, particle interface resistance, and electrode contact resistance, to thereby determine the bulk resistance R.

The volume resistivity (Ω·cm) of the silica particles is computed using a computational formula shown below.

$$\rho=R/L \qquad \text{Formula:}$$

In the above formula, ρ is the volume resistivity (Ω·cm) of the silica particles, and R is the bulk resistance. L is the thickness (cm) of the silica particle layer.

(Number of OH Group)

In the specific silica particles, the number of OH groups measured by the Sears method is preferably from $0.2/nm^2$ to $5.5/nm^2$ inclusive and is more preferably from $0.2/nm^2$ to $4/nm^2$ inclusive and still more preferably from $0.2/nm^2$ to $3/nm^2$ inclusive, from the viewpoint of narrowing the charge distribution on the silica particles to thereby prevent fogging, clouding and a reduction in thin line reproducibility.

The number of OH groups measured by the Sears method can be adjusted within the above range by forming the structure formed from the reaction product of the trifunctional silane coupling agent on the silica base particles.

By reducing the number of OH groups that inhibit the adsorption of the elemental nitrogen-containing compound to the above range, the elemental nitrogen-containing compound can easily penetrate deep into the pores in the silica particles (for example, pores in the adsorption layer described later). In this case, hydrophobic interaction acts on the elemental nitrogen-containing compound, and its adhesion to the silica particles is enhanced. Therefore, the adsorption amount of the elemental nitrogen-containing compound increases. Moreover, the elemental nitrogen-containing compound resists separation from the silica particles. Therefore, the ability of the elemental nitrogen-containing compound to narrow the charge distribution is improved, and the retainability of the narrow charge distribution is improved. In this case, the reduction in the image unevenness and in the scattering of the toner due to the narrowing of the charge distribution on the silica particles can be easily achieved.

By reducing the number of OH groups to the above range, the environment dependence of the charging characteristics is lowered, and the ability of the elemental nitrogen-containing compound to narrow the charge distribution can be easily achieved in any environment (particularly in a low-temperature low-humidity environment in which negative chargeability is excessively high). Therefore, the reduction in the image unevenness and in the scattering of the toner due to the narrowing of the charge distribution on the silica particles under the specific conditions can be easily achieved.

The number of OH groups is measured by the Sears method. Specifically, the number of OH groups is measured as follows.

1.5 g of the silica particles are added to a pure water 50 g/ethanol 50 g solution mixture, and the mixture is stirred using an ultrasonic homogenizer for 2 minutes to produce a dispersion. While the dispersion is stirred in an environment of 25° C., 1.0 g of a 0.1 mol/L aqueous hydrochloric acid solution is added dropwise to obtain a test solution. The test solution obtained is placed in an automatic titrator, and potentiometric titration is performed using a 0.01 mol/L aqueous sodium hydroxide solution to produce a differential titration curve. A titer at an inflection point at which the derivative of the titration curve is 1.8 or more and the titer of the 0.01 mol/L aqueous sodium hydroxide is maximum is defined as H.

The following formula is used to compute the silanol group density ρ (the number of silanol groups/$nm^2$) on the surfaces of the silica particles.

$$\rho=((0.01\times H-0.1)\times NA/1000)/(U\times S_{BET}\times 10^{18}) \quad \text{Formula:}$$

The symbols in the formula are as follows.

H: The titer at the inflection point at which the derivative of the titration curve is 1.8 or more and the titer of the 0.01 mol/L aqueous sodium hydroxide is maximum.

NA: Avogadro's number

U: The amount of silica particles (1.5 g)

$S_{BET}$: The specific surface area ($m^2/g$) of the silica particles. The specific surface area of the silica particles is measured by the BET nitrogen adsorption three-point method. The equilibrium relative pressure is 0.3.

—Method for Producing Specific Silica Particles—

An example of a method for producing the specific silica particles includes:

a first step of forming the structure formed from the reaction product of the trifunctional silane coupling agent on at least part of the surfaces of the silica base particles; and a second step of causing the elemental nitrogen-containing compound containing elemental molybdenum to adsorb on at least part of the pores in the reaction product of the trifunctional silane coupling agent.

The method for producing the specific silica particles may further include a third step of, after or during the second step, subjecting, to hydrophobization treatment, the silica base particles each having the structure that covers at least part of the surface of the silica base particle and is formed from the reaction product of the trifunctional silane coupling agent and in which the elemental nitrogen-containing compound containing elemental molybdenum is adsorbed on at least part of the pores in the reaction product of the trifunctional silane coupling agent.

The steps in the method for producing the specific silica particles will be described in detail.

[Preparation Step]

First, the step of preparing the silica base particles will be described.

Examples of the preparation step include:

(i) the step of preparing a silica base particle suspension by mixing a solvent containing an alcohol and the silica base particles; and (ii) the step of obtaining a silica base particle suspension by forming the silica base particles using a sol-gel method.

Examples of the silica base particles used in the step (i) include: sol-gel silica particles (silica particles obtained by a sol-gel method); aqueous colloidal silica particles; alcoholic silica particles; fumed silica particles obtained by a vapor phase method; and fused silica particles.

The alcohol-containing solvent used in the step (i) may be a solvent composed only of the alcohol or may be a solvent mixture of the alcohol and an additional solvent. Examples of the alcohol include lower alcohols such as methanol, ethanol, n-propanol, isopropanol, and butanol. Examples of the additional solvent include: water; ketones such as acetone, methyl ethyl ketone, and methyl isobutyl ketone; cellosolves such as methyl cellosolve, ethyl cellosolve, butyl cellosolve, and cellosolve acetate; and ethers such as dioxane and tetrahydrofuran. When the solvent mixture is used, the ratio of the alcohol is preferably 80% by mass or more and more preferably 85% by mass or more.

The step (ii) may be the step of forming the silica base particles by a sol-gel method to thereby obtain the silica base particle suspension.

More specifically, the step (ii) may be, for example, a sol-gel method including:

an alkaline catalyst solution preparing step of preparing an alkaline catalyst solution in which an alkaline catalyst is contained in a solvent containing an alcohol; and a silica base particle forming step of forming the silica base particles by supplying tetraalkoxysilane and an alkaline catalyst to the alkaline catalyst solution.

The alkaline catalyst solution preparing step may be a step of preparing the alcohol-containing solvent and mixing the solvent and the alkaline catalyst to obtain the alkaline catalyst solution.

The alcohol-containing solvent may be a solvent composed only of the alcohol or may be a solvent mixture of the alcohol and an additional solvent. Examples of the alcohol include lower alcohols such as methanol, ethanol, n-propanol, isopropanol, and butanol. Examples of the additional solvent include: water; ketones such as acetone, methyl ethyl ketone, and methyl isobutyl ketone; cellosolves such as methyl cellosolve, ethyl cellosolve, butyl cellosolve, and cellosolve acetate; and ethers such as dioxane and tetrahydrofuran. When the solvent mixture is used, the ratio of the alcohol is preferably 80% by mass or more and more preferably 85% by mass or more.

The alkaline catalyst is a catalyst for facilitating the reactions of the tetraalkoxysilane (hydrolysis and condensation reactions). Examples of the catalyst include basic catalysts such as ammonia, urea, and monoamines, and ammonia may be used.

The concentration of the alkaline catalyst in the alkaline catalyst solution is preferably from 0.5 mol/L to 1.5 mol/L inclusive, more preferably from 0.6 mol/L to 1.2 mol/L inclusive, and still more preferably from 0.65 mol/L to 1.1 mol/L inclusive.

The silica base particle forming step is the step of forming the silica base particles by supplying the tetraalkoxysilane and an alkaline catalyst to the alkaline catalyst solution to allow the reactions (hydrolysis and condensation reactions) of the tetraalkoxysilane to proceed in the alkaline catalyst solution.

In the silica base particle forming step, nuclear particles are formed by the reactions of the tetraalkoxysilane during the initial stage of supply of the tetraalkoxysilane (nuclear particle formation stage), and the nuclear particles are allowed to grow (nuclear particle growth stage), whereby the silica base particles are formed.

Examples of the tetraalkoxysilane include tetramethoxysilane, tetraethoxysilane, tetrapropoxysilane, and tetrabutoxysilane. From the viewpoint of the controllability of the reaction rate and the uniformity of the shapes of the silica base particles to be formed, tetramethoxysilane or tetraethoxysilane may be used.

Examples of the alkaline catalyst supplied to the alkaline catalyst solution include basic catalysts such as ammonia, urea, monoamines, and quaternary ammonium salts, and ammonia may be used. The alkaline catalyst supplied together with the tetraalkoxysilane may be the same as the alkaline catalyst contained in advance in the alkaline catalyst solution or may be different therefrom. The same alkaline catalyst may be used.

The tetraalkoxysilane and the alkaline catalyst may be supplied continuously to the alkaline catalyst solution or may be supplied intermittently to the alkaline catalyst solution.

In the silica base particle forming step, the temperature of the alkaline catalyst solution (its temperature during supply) is preferably from 5° C. to 50° C. inclusive and more preferably from 15° C. to 45° C. inclusive.

[First Step]

In the first step, the structure formed from the reaction product of the trifunctional silane coupling agent is formed.

Specifically, in the first step, for example, the trifunctional silane coupling agent is added to the silica base particle suspension to allow the trifunctional silane coupling agent to react on the surfaces of the silica base particles, and the structure formed from the reaction product of the trifunctional silane coupling agent is thereby formed. The trifunctional silane coupling agent forms the structure formed from its reaction product through the reaction between functional groups of the trifunctional silane coupling agent and the reaction of functional groups of the trifunctional silane coupling agent and OH groups on the surfaces of the silica particles.

The trifunctional silane coupling agent is allowed to react by adding the trifunctional silane coupling agent to the silica base particle suspension and heating the resulting suspension under stirring.

Specifically, for example, the suspension is heated to from 40° C. to 70° C. inclusive. Then the trifunctional silane coupling agent is added, and the mixture is stirred. The stirring is continued for preferably from 10 minutes to 24 hours inclusive, more preferably from 60 minutes to 420 minutes inclusive, and still more preferably from 80 minutes to 300 minutes inclusive.

[Second Step]

In the second step, the elemental nitrogen-containing compound is caused to adsorb on at least part of the pores in the reaction product of the trifunctional silane coupling agent.

Specifically, in the second step, for example, the elemental nitrogen-containing compound is added to the silica base particle suspension, and the mixture is stirred in the temperature range of, for example, from 20° C. to 50° C. inclusive. The elemental nitrogen-containing compound thereby adsorbs on at least part of the pores in the reaction product of the trifunctional silane coupling agent.

In the second step, for example, an alcohol solution containing the elemental nitrogen-containing compound may be added to the silica base particle suspension.

The alcohol may be the same alcohol as that contained in the silica base particle suspension or may be different therefrom. The same alcohol may be used.

In the alcohol solution containing the elemental nitrogen-containing compound, the concentration of the elemental nitrogen-containing compound is preferably from 0.05% by mass to 10% by mass inclusive and more preferably from 0.1% by mass to 6% by mass inclusive.

[Third Step]

In the third step, the silica base particles each having the structure in which the elemental nitrogen-containing compound is adsorbed on at least part of the pores in the reaction product of the trifunctional silane coupling agent is subjected to hydrophobization treatment after or during the second step.

Specifically, in the third step, for example, the elemental nitrogen-containing compound is added to the silica base particle suspension in which the above structure has been formed, and then the hydrophobizing agent is added.

The hydrophobizing agent forms a hydrophobization treatment layer through the reaction between functional groups of the hydrophobizing agent and the reaction of functional groups of the hydrophobizing agent and OH groups of the silica base particles.

The hydrophobizing agent is allowed to react by adding the trifunctional silane coupling agent to the silica base particle suspension and then heating the resulting suspension under stirring.

Specifically, for example, the suspension is heated to from 40° C. to 70° C. inclusive. Then the hydrophobizing agent is added, and the mixture is stirred. The stirring is continued for preferably from 10 minutes to 24 hours inclusive, more preferably from 20 minutes to 120 minutes inclusive, and still more preferably from 20 minutes to 90 minutes inclusive.

[Drying Step]

In the specific silica particle production method, after the second or third step, a drying step of removing the solvent from the suspension may be performed. The drying step may be performed during the second or third step.

Examples of the drying include thermal drying, spray drying, and supercritical drying.

The spray drying can be performed using a well-known method using a commercial spray dryer (such as a rotary disc-type or nozzle-type dryer). For example, the spraying solution is sprayed into a hot gas stream at a rate of from 0.2 L/hour to 1 L/hour inclusive. In this case, the temperature of the hot gas is preferably in the range of from 70° C. to 400° C. inclusive at the inlet of the spay dryer and in the range of from 40° C. to 120° C. inclusive at the outlet of the spay dryer. If the temperature at the inlet is lower than 70° C., the solids contained in the dispersion are not dried sufficiently. If the temperature at the inlet is higher than 400° C., the particles are deformed in shape during spray drying. If the temperature at the outlet is lower than 40° C., the solids are not well dried and adhere to the apparatus. The temperature at the inlet is more preferably in the range of from 100° C. to 300° C. inclusive.

The concentration of the silica particles in the silica base particle suspension may be in the range of from 10% by mass to 30% by mass inclusive in terms of solid content.

In the supercritical drying, the solvent is removed by a supercritical fluid. Therefore, surface tension is unlikely to be exerted between the particles, and the primary particles contained in the suspension are dried with aggregation of the primary particles prevented. It is therefore easy to obtain silica particles with high uniformity in diameter.

Examples of the material used as the supercritical fluid include carbon dioxide, water, methanol, ethanol, and acetone. From the viewpoint of the efficiency of the treatment and from the viewpoint of reducing the formation of coarse particles, the solvent removing step may be the step using supercritical carbon dioxide.

Specifically, the supercritical drying is performed according to, for example, the following procedure.

The suspension is placed in a sealed reaction vessel, and then liquid carbon dioxide is introduced into the sealed reaction vessel. The sealed reaction vessel is then heated, and the pressure inside the sealed reaction vessel is increased using a high-pressure pump to bring the carbon dioxide in the sealed reaction vessel into a supercritical state. Next, liquid carbon dioxide is introduced into the sealed reaction vessel so that the supercritical carbon dioxide flows out from the sealed reaction vessel, and the supercritical carbon dioxide is thereby allowed to circulate through the suspension in the sealed reaction vessel. While the supercritical carbon dioxide circulates through the suspension, the solvent is dissolved in the supercritical carbon dioxide and removed together with the supercritical carbon dioxide flowing out from the sealed reaction vessel.

The temperature and pressure inside the sealed reaction vessel are those at which carbon dioxide becomes supercritical. The critical point of carbon dioxide is 31.1° C./7.38 MPa. Therefore, the temperature is, for example, from 40° C. to 200° C. inclusive, and the pressure is, for example, from 10 MPa to 30 MPa inclusive.

The flow rate of the supercritical fluid during the supercritical drying may be from 80 mL/second to 240 mL/second inclusive.

The specific silica particles obtained may be optionally pulverized or sieved to remove coarse particles and aggregates. The pulverization is performed using, for example, a dry pulverizing machine such as a jet mill, a vibration mill, a ball mill, or a pin mill. The sieving is performed using, for example, a vibrating sieve or air sieving machine.

The amount (content) of the specific silica particles externally added with respect to the mass of the toner particles is preferably from 0.25% by mass to 2.0% by mass inclusive and more preferably from 0.5% by mass to 1.5% by mass inclusive.

—Additional External Additives—

Additional external additives other than the specific silica particles may also be used.

Examples of the additional external additives include inorganic particles other than the specific silica particles and organic particles.

Examples of the inorganic particles other than the specific silica particles include particles of silica, alumina, titanium oxide, barium titanate, magnesium titanate, calcium titanate, strontium titanate, zinc oxide, chromium oxide, cerium oxide, magnesium oxide, zirconium oxide, silicon carbide, and silicon nitride.

The surfaces of these inorganic particles may be subjected to hydrophobization treatment. The hydrophobization treatment is performed, for example, by immersing the inorganic particles in a hydrophobizing agent. No particular limitation is imposed on the hydrophobizing agent. Examples of the hydrophobizing agent include silane-based coupling agents, silicone oils, titanate-based coupling agents, and aluminum-based coupling agents. Any one of them may be used alone, or two or more of them may be used in combination.

The amount of the hydrophobizing agent is generally, for example, from 1 part by mass to 10 parts by mass inclusive based on 100 parts by mass of the inorganic particles.

Examples of the organic particles include resin particles (particles of resins such as polystyrene, polymethyl methacrylate (PMMA), and melamine resins).

The amount (content) of the additional external additives added externally with respect to the mass of the toner particles is, for example, preferably from 0.05% by mass to 5.0% by mass inclusive and more preferably from 0.5% by mass to 3.0% by mass inclusive.

(Method for Producing Toner)

A method for producing the toner according to the present exemplary embodiment will next be described.

The toner according to the present exemplary embodiment is obtained by producing toner particles and then externally adding optional external additives to the toner particles produced.

The toner particles may be produced by a dry production method (such as a kneading-grinding method) or by a wet production method (such as an aggregation/coalescence method, a suspension polymerization method, or a dissolution/suspension method). No particular limitation is imposed on the toner particle production method, and any known production method may be used.

In particular, the aggregation/coalescence method may be used to obtain the toner particles.

Specifically, when the toner particles are produced, for example, by the aggregation/coalescence method, the toner particles are produced through: the step of preparing a resin particle dispersion in which resin particles used as the binder resin are dispersed (a resin particle dispersion preparing step); the step of aggregating the resin particles (and other optional particles) in the resin particle dispersion (the dispersion may optionally contain an additional particle dispersion mixed therein) to form aggregated particles (an aggregated particle forming step); and the step of heating the aggregated particle dispersion with the aggregated particles dispersed therein to fuse and coalesce the aggregated particles to thereby form the toner particles (a fusion/coalescence step).

These steps will next be described in detail.

In the following, a method for obtaining toner particles containing the coloring agent and the release agent will be described, but the coloring agent and the release agent are used optionally. Of course, an additional additive other than the coloring agent and the release agent may be used.

—Resin Particle Dispersion Preparing Step—

First, the resin particle dispersion in which the resin particles used as the binder resin are dispersed is prepared, and, for example, a coloring agent particle dispersion in which coloring agent particles are dispersed and a release agent particle dispersion in which release agent particles are dispersed are prepared.

The resin particle dispersion is prepared, for example, by dispersing the resin particles in a dispersion medium using a surfactant.

Examples of the dispersion medium used for the resin particle dispersion include aqueous mediums.

Examples of the aqueous medium include: water such as distilled water and ion exchanged water; and alcohols. Any of these may be used alone or in combination of two or more.

Examples of the surfactant include: anionic surfactants such as sulfate-based surfactants, sulfonate-based surfactants, phosphate-based surfactants, and soap-based surfactants; cationic surfactants such as amine salt-based surfactants and quaternary ammonium salt-based surfactants; and nonionic surfactants such as polyethylene glycol-based surfactants, alkylphenol ethylene oxide adduct-based surfactants, and polyhydric alcohol-based surfactants. Of these, an anionic surfactant or a cationic surfactant may be used. A nonionic surfactant may be used in combination with the anionic surfactant or the cationic surfactant.

Any of these surfactants may be used alone or in combination of two or more.

To disperse the resin particles in the dispersion medium to form the resin particle dispersion, a commonly used dispersing method that uses, for example, a rotary shearing-type homogenizer, a ball mill using media, a sand mill, or a dyno-mill may be used. The resin particles may be dispersed in the dispersion medium, for example, by a phase inversion emulsification method, but this depends on the type of resin particles.

In the phase inversion emulsification method, the resin to be dispersed is dissolved in a hydrophobic organic solvent that can dissolve the resin, and a base is added to the organic continuous phase (O phase) to neutralize it. Then the aqueous medium (W phase) is added to change the form of the resin from W/O to O/W (i.e., to perform phase inversion) to thereby form a discontinuous phase, so that the resin is dispersed as particles in the aqueous medium.

The volume average diameter of the resin particles dispersed in the resin particle dispersion is, for example, preferably from 0.01 μm to 1 μm inclusive, more preferably from 0.08 μm to 0.8 μm inclusive, and still more preferably from 0.1 μm to 0.6 μm inclusive.

The volume average particle diameter of the resin particles is measured as follows. A particle size distribution measured by a laser diffraction particle size measurement apparatus (e.g., LA-700 manufactured by HORIBA Ltd.) is used and divided into different particle diameter ranges (channels), and a cumulative volume distribution computed from the small particle diameter side is determined. The particle diameter at which the cumulative frequency is 50% is measured as the volume average particle diameter D50v. The volume average diameters of particles in other dispersions are measured in the same manner The content of the resin particles contained in the resin particle dispersion is, for example, preferably from 5% by mass to 50% by mass inclusive and more preferably from 10% by mass to 40% by mass inclusive.

For example, the coloring agent particle dispersion and the release agent particle dispersion are prepared in a similar manner to the resin particle dispersion. Specifically, the descriptions of the volume average diameter of the particles in the resin particle dispersion, the dispersion medium for the resin particle dispersion, the dispersing method, and the content of the resin particles are applicable to the coloring agent particles dispersed in the coloring agent particle dispersion and the release agent particles dispersed in the release agent particle dispersion.

—Aggregated Particle Forming Step—

Next, the resin particle dispersion, the coloring agent particle dispersion, and the release agent particle dispersion are mixed.

Then the resin particles, the coloring agent particles, and the release agent particles are hetero-aggregated in the dispersion mixture to form aggregated particles containing the resin particles, the coloring agent particles, and the release agent particles and having diameters close to the diameters of target toner particles.

Specifically, for example, a flocculant is added to the dispersion mixture, and the pH of the dispersion mixture is adjusted to acidic (for example, a pH of from 2 to 5 inclusive). Then a dispersion stabilizer is optionally added, and the resulting mixture is heated to the glass transition temperature of the resin particles (specifically, for example, a temperature equal to or higher than the glass transition temperature of the resin particles−30° C. and equal to or lower than the glass transition temperature−10° C.) to aggregate the particles dispersed in the dispersion mixture to thereby form aggregated particles.

In the aggregated particle forming step, the flocculant may be added at room temperature (e.g., 25° C.) while the dispersion mixture is agitated, for example, in a rotary shearing-type homogenizer. Then the pH of the dispersion mixture may be adjusted to acidic (e.g., a pH of from 2 to 5 inclusive), and the dispersion stabilizer may be optionally added. Then the resulting mixture may be heated.

Examples of the flocculant include a surfactant with a polarity opposite to the polarity of the surfactant used as the dispersant added to the dispersion mixture, inorganic metal salts, and divalent or higher polyvalent metal complexes. In particular, when a metal complex is used as the flocculant, the amount of the surfactant used can be small, and charging characteristics are improved.

An additive that forms a complex with a metal ion in the flocculant or a similar bond may be optionally used. The additive used may be a chelating agent.

Examples of the inorganic metal salts include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

The chelating agent used may be a water-soluble chelating agent. Examples of the chelating agent include: oxycarboxylic acids such as tartaric acid, citric acid, and gluconic acid; iminodiacetic acid (IDA); nitrilotriacetic acid (NTA); and ethylenediaminetetraacetic acid (EDTA).

The amount of the chelating agent added is, for example, preferably from 0.01 parts by mass to 5.0 parts by mass inclusive and more preferably 0.1 parts by mass or more and less than 3.0 parts by mass based on 100 parts by mass of the resin particles.

—Fusion/Coalescence Step—

Next, the aggregated particle dispersion in which the aggregated particles are dispersed is heated, for example, to a temperature equal to or higher than the glass transition temperature of the resin particles (e.g., a temperature higher by 10 to 30° C. than the glass transition temperature of the resin particles) to fuse and coalesce the aggregated particles to thereby form toner particles.

The toner particles are obtained through the above-described steps.

Alternatively, the toner particles may be produced through: the step of, after the preparation of the aggregated particle dispersion containing the aggregated particles dispersed therein, mixing the aggregated particle dispersion further with the resin particle dispersion containing the resin particles dispersed therein and then causing the resin particles to adhere to the surfaces of the aggregated particles to aggregate them to thereby form second aggregated particles; and the step of heating a second aggregated particle dispersion containing the second aggregated particles dispersed therein to fuse and coalesce the second aggregated particles to thereby form toner particles having the core-shell structure.

After completion of the fusion/coalescence step, the toner particles formed in the solution are subjected to a well-known washing step, a solid-liquid separation step, and a drying step to obtain dried toner particles.

From the viewpoint of chargeability, the toner particles may be subjected to displacement washing with ion exchanged water sufficiently in the washing step. No particular limitation is imposed on the solid-liquid separation step. From the viewpoint of productivity, suction filtration, pressure filtration, etc. may be performed in the solid-liquid separation step. No particular limitation is imposed on the drying step. From the viewpoint of productivity, freeze-drying, flash drying, fluidized drying, vibrating fluidized drying, etc. may be performed in the drying step.

The toner according to the present exemplary embodiment is produced, for example, by adding the external additives to the dried toner particles obtained and mixing them. The mixing may be performed, for example, using a V blender, a Henschel mixer, a Loedige mixer, etc. If necessary, coarse particles in the toner may be removed using a vibrating sieving machine, an air sieving machine, etc.

(Carrier)

The carrier in the present exemplary embodiment will be described in detail.

The carrier in the present exemplary embodiment has a relative dielectric loss factor of from 0.5 to 2.0 inclusive. No particular limitation is imposed on the carrier so long as it has a relative dielectric loss factor within the above range, and any well-known carrier may be used. Examples of the carrier include: a coated carrier prepared by coating the surface of a core material formed of a magnetic powder with a coating resin; a magnetic powder-dispersed carrier prepared by dispersing a magnetic powder in a matrix resin; and a resin-impregnated carrier prepared by impregnating a porous magnetic powder with a resin.

Each of the magnetic powder-dispersed carrier and the resin-impregnated carrier may be a carrier in which the particles included in the carrier are used as a core material and coated with the coating resin.

The core material may be a particulate magnetic powder, i.e., magnetic particles, because the relative dielectric loss factor of the carrier can be easily controlled.

The magnetic particles may have a volume average particle diameter of, for example, from 20 μm to 50 μm inclusive.

Examples of the magnetic particles include particles of magnetic metals such as iron nickel, and cobalt and magnetic oxides such as ferrite and magnetite.

In the present exemplary embodiment, the magnetic particles used as the core material may contain ferrite represented by formula (1) below. When the magnetic particles contain the ferrite represented by formula (1), the relative dielectric loss factor of the carrier in the present embodiment can be easily adjusted within the above range.

$$(MO)_j(Fe_2O_3)_k \qquad \text{formula (1)}$$

In formula (1), k represents a numerical value of from 1.20 to 1.45 inclusive, and j represents a numerical value of 3-2k. M represents a metal element, and the ferrite contains at least Mg as the metal element.

When the amount of Fe is larger than that in the composition ratio of ferrite, i.e., Fe:M=2:1, dielectricity increases. Therefore, k in formula (1) is preferably a numerical value of from 1.20 to 1.45 inclusive and more preferably a numerical value of from 1.25 to 1.30 inclusive.

M in formula (1) is mainly Mg but may be a combination of Mg and at least one selected from the group consisting of Ti, Zr, Mn, Sr, Si, Li, Ca, Sn, Cu, Zn, and Ba. From the viewpoint of increasing the dielectricity of the carrier and reducing electric charge leakage in the developer, the content of Mg with respect to 1 mole of Fe is preferably from 0.04 moles to 0.20 moles inclusive and more preferably from 0.07 moles to 0.15 moles inclusive. The ferrite may contain, in addition to Mg, Mn for the same purpose. When Mn is used in combination with Mg, the content of Mn with respect to 1 mole of Fe is preferably from 0.002 moles to 0.05 moles inclusive and more preferably from 0.003 moles to 0.004 moles inclusive.

The ferrite may further contain T and Zr. As the amount of Fe increases, iron oxide is ferritized, and its crystals grow, so that the dielectricity increases. However, the ferrite has electrical conductivity. Therefore, although the dielectricity increases, the electric resistance decreases, so that electric charge leakage can easily occur. When Ti and Zr are present, the amount of electric charge leakage is reduced, and their adverse effect on the dielectricity is small.

The content of Ti with respect to 1 mole of Fe is preferably from 0.02 moles to 0.05 moles inclusive and more preferably from 0.03 moles to 0.04 moles inclusive. The content of Zr with respect to 1 mole of Fe is preferably from 0.014 moles to 0.018 moles inclusive and more preferably from 0.0153 moles to 0.016 moles inclusive. Only one of Ti and Zr may be contained, but a combination of Ti and Zr may be used.

The ferrite may further contain other metal elements such as Sr and Si. Their content with respect to 1 mole of Fe is preferably from 0.001 moles to 0.03 moles inclusive and more preferably from 0.003 moles to 0.02 moles inclusive.

By selecting the metals as described above, the relative dielectric loss factor of the carrier can be controlled.

In the present exemplary embodiment, the composition of the ferrite contained in the magnetic particles and the contents of the metals such as Mg, Mn, Ti, and Zr contained in the magnetic particles with respect to 1 mole of Fe are determined by the following method.

The constituent elements can be identified using fluorescence X-rays. Their contents are measured by quantitative analysis using calibration curves. The contents obtained are divided by the respective atomic weights to obtain the numbers of moles, and their ratios with respect to the amount of Fe are determined to obtain their molar ratios.

In the present exemplary embodiment, examples of the coating resin and the matrix resin used for the carrier include polyethylene, polypropylene, polystyrene, polyvinyl acetate, polyvinyl alcohol, polyvinyl butyral, polyvinyl chloride, polyvinyl ether, polyvinyl ketone, vinyl chloride-vinyl acetate copolymers, styrene-acrylate copolymers, straight silicone resins having organosiloxane bonds and modified products thereof, fluorocarbon resins, polyesters, polycarbonates, phenolic resins, and epoxy resins.

The coating resin and the matrix resin may contain additional additives such as electrically conductive particles.

Examples of the electrically conductive particles include: particles of metals such as gold, silver, and copper; and particles of carbon black, titanium oxide, zinc oxide, tin oxide, barium sulfate, aluminum borate, and potassium titanate.

To coat the surface of the core material with the coating resin, a coating layer-forming solution prepared by dissolving the coating resin and various optional additives in an appropriate solvent may be used. No particular limitation is imposed on the solvent, and a suitable solvent may be selected in consideration of the coating resin used, coatability, etc.

Specific examples of the resin coating method include: an immersion method in which the core material is immersed in the coating layer-forming solution; a spray method in which the coating layer-forming solution is sprayed onto the surface of the core material; a fluidized bed method in which the coating layer-forming solution is sprayed onto the core material floated by the flow of air; and a kneader-coater method in which the core material of the carrier and the coating layer-forming solution are mixed in a kneader coater and then the solvent is removed.

From the viewpoint of causing appropriate repulsion between the silica particles and the carrier to thereby maintain stable charging characteristics and reduce electric charge leakage, the mass ratio (silica/carrier) of the specific silica particles to the carrier is preferably from 0.03 to 0.15 inclusive, more preferably from 0.05 to 0.12 inclusive, and still more preferably from 0.07 to 0.10 inclusive.

The mixing ratio (mass ratio) of the toner to the carrier is preferably toner:carrier=1:100 to 30:100 and more preferably 3:100 to 20:100.

<Image Forming Apparatus and Image Forming Method>

An image forming apparatus and an image forming method according to the present exemplary embodiment will be described.

The image forming apparatus according to the present exemplary embodiment includes: an image holding member; a charging device that charges the surface of the image holding member; an electrostatic image forming device that forms an electrostatic image on the charged surface of the image holding member; a developing device that houses an electrostatic image developer and develops the electrostatic image formed on the surface of the image holding member with the electrostatic image developer to thereby form a toner image; a transferring device that transfers the toner image formed on the surface of the image holding member onto a surface of a recording medium; and a fixing device that fixes the toner image transferred onto the surface of the recording medium. The electrostatic image developer used is the electrostatic image developer according to the present exemplary embodiment.

In the image forming apparatus according to the present exemplary embodiment, an image forming method (an image forming method according to the present exemplary embodiment) is performed. The image forming method includes: charging the surface of the image holding member; forming an electrostatic image on the charged surface of the image holding member; developing the electrostatic image formed on the surface of the image holding member with the electrostatic image developer according to the present exemplary embodiment to thereby form a toner image; transferring the toner image formed on the surface of the image holding member onto a surface of a recording medium; and fixing the toner image transferred onto the surface of the recording medium.

The image forming apparatus according to the present exemplary embodiment may be applied to known image forming apparatuses such as: a direct transfer-type apparatus that transfers a toner image formed on the surface of the image holding member directly onto a recording medium; an intermediate transfer-type apparatus that first-transfers a toner image formed on the surface of the image holding member onto the surface of an intermediate transfer body and second-transfers the toner image transferred onto the surface of the intermediate transfer body onto the surface of a recording medium; an apparatus including a cleaning device that cleans the surface of the image holding member after the transfer of the toner image but before charging; and an apparatus including a charge eliminating device that eliminates charges on the surface of the image holding member after transfer of the toner image but before charging by irradiating the surface of the image holding member with charge eliminating light.

When the image forming apparatus according to the present exemplary embodiment is the intermediate transfer-type apparatus, the transferring device includes, for example: an intermediate transfer body having a surface onto which a toner image is to be transferred; a first transferring device that first-transfers a toner image formed on the surface of the image holding member onto the surface of the intermediate transfer body; and a second transferring device that second-transfers the toner image transferred onto the surface of the intermediate transfer body onto the surface of a recording medium.

In the image forming apparatus according to the present exemplary embodiment, for example, a portion including the developing device may have a cartridge structure (process cartridge) that is detachably attached to the image forming apparatus. The process cartridge used may be, for example, a process cartridge including the developing device that houses the electrostatic image developer according to the present exemplary embodiment.

An example of the image forming apparatus according to the present exemplary embodiment will be described, but this is not a limitation. In the following description, major components shown in FIG. 1 will be described, and description of other components will be omitted.

FIG. 1 is a schematic configuration diagram showing the image forming apparatus according to the present exemplary embodiment.

The image forming apparatus shown in FIG. 1 includes first to fourth electrophotographic image forming units 10Y, 10M, 10C, and 10K (image forming devices) that output yellow (Y), magenta (M), cyan (C), and black (K) images, respectively, based on color-separated image data. These image forming units (hereinafter may be referred to simply as "units") 10Y, 10M, 10C, and 10K are arranged so as to be spaced apart from each other horizontally by a prescribed distance. These units 10Y, 10M, 10C, and 10K may each be a process cartridge detachably attached to the image forming apparatus.

An intermediate transfer belt (an example of the intermediate transfer body) 20 is disposed above the units 10Y, 10M, 10C, and 10K so as to extend through these units. The intermediate transfer belt 20 is wound around a driving roller 22 and a support roller 24 and runs in a direction from the first unit 10Y toward the fourth unit 10K, the driving roller 22 and the support roller 24 being in contact with the inner surface of the intermediate transfer belt 20. A force is applied to the support roller 24 by, for example, an unillustrated spring in a direction away from the driving roller 22, so that a tension is applied to the intermediate transfer belt 20 wound around the rollers. An intermediate transfer belt cleaner 30 is disposed on an image holding side of the intermediate transfer belt 20 so as to be opposed to the driving roller 22.

Yellow, magenta, cyan, and black toners contained in toner cartridges 8Y, 8M, 8C, and 8K, respectively, are supplied to developing units (examples of the developing device) 4Y, 4M, 4C, and 4K, respectively, of the units 10Y, 10M, 10C, and 10K.

The first to fourth units 10Y, 10M, 10C, and 10K have the same structure and operate similarly. Therefore, the first unit 10Y that is disposed upstream in the running direction of the intermediate transfer belt and forms a yellow image will be described as a representative unit.

The first unit 10Y includes a photoconductor 1Y serving as an image holding member. A charging roller (an example of the charging device) 2Y, an exposure unit (an example of the electrostatic image forming device) 3, a developing unit (an example of the developing device) 4Y, a first transfer roller 5Y (an example of the first transferring device), and a photoconductor cleaner (an example of the image holding member cleaning device) 6Y are disposed around the photoconductor 1Y in this order. The charging roller charges the surface of the photoconductor 1Y to a prescribed potential, and the exposure unit 3 exposes the charged surface to a laser beam 3Y according to a color-separated image signal to thereby form an electrostatic image. The developing unit 4Y supplies a charged toner to the electrostatic image to develop the electrostatic image, and the first transfer roller 5Y transfers the developed toner image onto the intermediate transfer belt 20. The photoconductor cleaner 6Y removes the toner remaining on the surface of the photoconductor 1Y after the first transfer.

The first transfer roller 5Y is disposed on the inner side of the intermediate transfer belt 20 and placed at a position opposed to the photoconductor 1Y. Bias power sources (not shown) for applying a first transfer bias are connected to the respective first transfer rollers 5Y, 5M, 5C, and 5K of the units. The bias power sources are controlled by an unillustrated controller to change the values of transfer biases applied to the respective first transfer rollers.

A yellow image formation operation in the first unit 10Y will be described.

First, before the operation, the surface of the photoconductor 1Y is charged by the charging roller 2Y to a potential of −600 V to −800 V.

The photoconductor 1Y is formed by stacking a photosensitive layer on a conductive substrate (with a volume resistivity of, for example, $1\times10^{-6}$ Ωcm or less at 20° C.). The photosensitive layer generally has a high resistance (the resistance of a general resin) but has the property that, when irradiated with a laser beam, the specific resistance of a portion irradiated with the laser beam is changed. Therefore, the charged surface of the photoconductor 1Y is irradiated with a laser beam 3Y from the exposure unit 3 according to yellow image data sent from an unillustrated controller. An electrostatic image with a yellow image pattern is thereby formed on the surface of the photoconductor 1Y.

The electrostatic image is an image formed on the surface of the photoconductor 1Y by charging and is a negative latent image formed as follows. The specific resistance of the irradiated portions of the photosensitive layer irradiated with the laser beam 3Y decreases, and this causes charges on the surface of the photoconductor 1Y to flow. However, the charges in portions not irradiated with the laser beam 3Y remain present, and the electrostatic image is thereby formed.

The electrostatic image formed on the photoconductor 1Y rotates to a prescribed developing position as the photoconductor 1Y rotates. Then the electrostatic image on the photoconductor 1Y at the developing position is developed and visualized as a toner image by the developing unit 4Y.

An electrostatic image developer containing, for example, at least a yellow toner and a carrier is contained in the developing unit 4Y. The yellow toner is agitated in the developing unit 4Y and thereby frictionally charged. The charged yellow toner has a charge with the same polarity (negative polarity) as the charge on the photoconductor 1Y and is held on a developer roller (an example of a developer holding member). As the surface of the photoconductor 1Y passes through the developing unit 4Y, the yellow toner electrostatically adheres to charge-eliminated latent image portions on the surface of the photoconductor 1Y, and the latent image is thereby developed with the yellow toner. Then the photoconductor 1Y with the yellow toner image formed thereon continues running at a prescribed speed, and the toner image developed on the photoconductor 1Y is transported to a prescribed first transfer position.

When the yellow toner image on the photoconductor 1Y is transported to the first transfer position, a first transfer bias is applied to the first transfer roller 5Y, and an electrostatic force directed from the photoconductor 1Y toward the first transfer roller 5Y acts on the toner image, so that the toner image on the photoconductor 1Y is transferred onto the intermediate transfer belt 20. The transfer bias applied in this case has a (+) polarity opposite to the (−) polarity of the toner and is controlled to, for example, +10 μA in the first unit 10Y by the controller (not shown).

The toner remaining on the photoconductor 1Y is removed and collected by the photoconductor cleaner 6Y.

The first transfer biases applied to the first transfer rollers 5M, 5C, and 5K of the second unit 10M and subsequent units are controlled in the same manner as in the first unit.

The intermediate transfer belt 20 with the yellow toner image transferred thereon in the first unit 10Y is sequentially transported through the second to fourth units 10M, 10C and 10K, and toner images of respective colors are superimposed and multi-transferred.

Then the intermediate transfer belt 20 with the four color toner images multi-transferred thereon in the first to fourth units reaches a second transfer portion that is composed of the intermediate transfer belt 20, the support roller 24 in contact with the inner surface of the intermediate transfer belt, and a second transfer roller (an example of the second transferring device) 26 disposed on the image holding surface side of the intermediate transfer belt 20. A recording paper sheet (an example of the recording medium) P is supplied to a gap between the second transfer roller 26 and the intermediate transfer belt 20 in contact with each other at a prescribed timing through a supply mechanism, and a second transfer bias is applied to the support roller 24. The transfer bias applied in this case has the same polarity (−) as the polarity (−) of the toner, and an electrostatic force directed from the intermediate transfer belt 20 toward the recording paper sheet P acts on the toner image, so that the toner image on the intermediate transfer belt 20 is transferred onto the recording paper sheet P. In this case, the second transfer bias is determined according to a resistance detected by a resistance detection device (not shown) that detects the resistance of the second transfer portion and is voltage-controlled.

Then the recording paper sheet P with the toner image transferred thereonto is transported to a press contact portion (nip portion) of a pair of fixing rollers in a fixing unit (an example of the fixing device) 28, and the toner image is fixed onto the recording paper sheet P to thereby form a fixed image. The recording paper sheet P with the color image fixed thereon is transported to an ejection portion, and a series of the color image formation operations is thereby completed.

Examples of the recording paper sheet P onto which a toner image is to be transferred include plain paper sheets used for electrophotographic copying machines, printers, etc. Examples of the recording medium include, in addition to the recording paper sheets P, transparencies.

To further improve the smoothness of the surface of a fixed image, it may be necessary that the surface of the recording paper sheet P be smooth. For example, coated paper prepared by coating the surface of plain paper with, for example, a resin, art paper for printing, etc. are suitably used.

<Process Cartridge>

A process cartridge according to the present exemplary embodiment will be described.

The process cartridge according to the present exemplary embodiment includes a developing device that houses the electrostatic image developer according to the present exemplary embodiment and develops an electrostatic image formed on the surface of an image holding member with the electrostatic image developer to thereby form a toner image. The process cartridge is detachably attached to the image forming apparatus.

The process cartridge according to the present exemplary embodiment may include the developing device and at least one optional device selected from other devices such as an image holding member, a charging device, an electrostatic image forming device, and a transferring device.

An example of the process cartridge according to the present exemplary embodiment will be described, but this is not a limitation. In the following description, major components shown in FIG. 2 will be described, and description of other components will be omitted.

Figure 2:
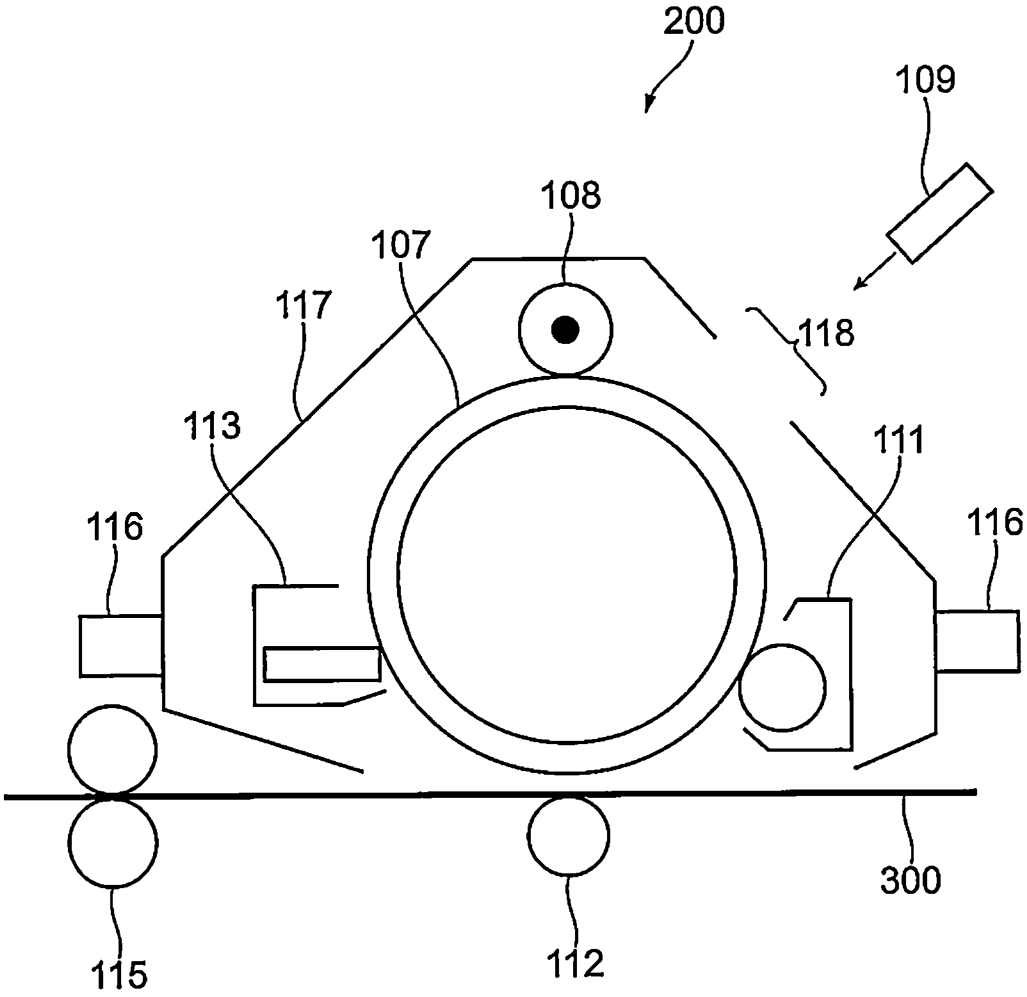
FIG. 2 is a schematic configuration diagram showing an example of a process cartridge detachably attached to the image forming apparatus according to the exemplary embodiment.

FIG. 2 is a schematic configuration diagram showing an example of the process cartridge according to the present exemplary embodiment.

The process cartridge 200 shown in FIG. 2 includes, for example, a housing 117 including mounting rails 116 and an opening 118 for light exposure and further includes a photoconductor 107 (an example of the image holding member), a charging roller 108 (an example of the charging device) disposed on the circumferential surface of the photoconductor 107, a developing unit 111 (an example of the developing device), and a photoconductor cleaner 113 (an example of the cleaning device), which are integrally combined and held in the housing 117 to thereby form a cartridge.

In FIG. 2, 109 denotes an exposure unit (an example of the electrostatic image forming device), and 112 denotes a transferring unit (an example of the transferring device). 115 denotes a fixing unit (an example of the fixing device), and 300 denotes a recording paper sheet (an example of the recording medium).

EXAMPLES

The exemplary embodiment of the disclosure will be described in detail by way of Examples. However, the exemplary embodiment of the disclosure is not limited to these Examples. In the following description, "parts" and "%" are based on mass, unless otherwise specified.

<Production of Toner Particles>

(Toner Particles (1))

—Synthesis of Amorphous Polyester Resin—

Ethylene oxide adduct of bisphenol A [manufactured by FUJIFILM Wako Pure Chemical Corporation]: 150 parts Propylene oxide adduct of bisphenol A [manufactured by FUJIFILM Wako Pure Chemical Corporation]: 250 parts Tetrapropenylsuccinic anhydride [manufactured by FUJIFILM Wako Pure Chemical Corporation]: 130 parts Terephthalic acid [manufactured by FUJIFILM Wako Pure Chemical Corporation]:100 parts Trimellitic acid [manufactured by FUJIFILM Wako Pure Chemical Corporation]: 15 parts The above monomer components are placed in a reaction vessel equipped with a stirrer, a thermometer, a condenser, and a nitrogen gas introduction tube, and the reaction vessel is purged with dry nitrogen gas. Then tin dioctoate is added in an amount of 0.3% with respect to the total amount of the monomer components. The temperature is increased to 235° C. over 1 hour in a nitrogen gas flow, and the mixture is allowed to react for 3 hours. The pressure inside the reaction vessel is reduced to 10.0 mmHg, and the mixture is allowed to react under stirring. When the desired molecular weight is reached, the reaction is terminated.

The amorphous polyester resin obtained has a glass transition temperature of 61° C., a weight average molecular weight of 42,000, and an acid value of 13 mgKOH/g.

—Preparation of Amorphous Polyester Resin Dispersion—

Amorphous polyester resin: 100 parts

Methyl ethyl ketone: 60 parts

Isopropyl alcohol: 10 parts

The above components are placed in a reaction vessel equipped with a stirrer and dissolved at 60° C. After confirmation of dissolution, the reaction vessel is cooled to 35° C., and then 3.5 parts of a 10% ammonia water solution is added.

Next, 300 parts of ion exchanged water is added dropwise to the reaction vessel over 3 hours to prepare a polyester resin dispersion. Next, methyl ethyl ketone and isopropyl alcohol are removed using an evaporator to thereby obtain an amorphous polyester resin dispersion.

—Preparation of Coloring Agent Particle Dispersion—

Cyan pigment [Pigment Blue 15:3, manufactured by Dainichiseika Color & Chemicals Mfg. Co., Ltd.]: 10 parts Anionic surfactant [NEOGEN SC manufactured by DAI-ICHI KOGYO SEIYAKU]: 2 parts Ion exchanged water: 80 parts The above materials are mixed and dispersed using a high-pressure impact disperser Ultimaizer [HJP30006 manufactured by Sugino Machine Limited] for 1 hour to thereby obtain a coloring agent particle dispersion having a volume average particle diameter of 180 nm and a solid content of 20%.

—Preparation of Release Agent Particle Dispersion—

Paraffin wax [HNP 9 manufactured by Nippon Seiro Co., Ltd.]: 50 parts

Anionic surfactant [NEOGEN SC manufactured by DAI-ICHI KOGYO SEIYAKU Co., Ltd.]: 2 parts Ion exchanged water: 200 parts The above components are heated to 120° C., mixed and dispersed using ULTRA-TURRAX T50 manufactured by IKA, and then subjected to dispersion treatment using a pressure discharge-type homogenizer to thereby obtain a release agent particle dispersion having a volume average particle diameter of 200 nm and a solid content of 20%.

—Production of Toner Particles (1)—

Amorphous polyester resin particle dispersion: 210 parts

Coloring agent particle dispersion: 25 parts

Release agent particle dispersion: 30 parts

Polyaluminum chloride: 0.4 parts

Ion exchanged water: 100 parts

The above components are placed in a stainless steel-made flask, mixed and dispersed using ULTRA-TURRAX T50 manufactured by IKA, and then heated to 48° C. in a heating oil bath under stirring. The flask is held at 48° C. for 25 minutes, and then an additional 70 parts of the above polyester resin dispersion is gradually added to the flask.

Then the pH of the system is adjusted to 8.0 using an aqueous sodium hydroxide solution with a concentration of 0.5 mol/L. Then the stainless steel-made flask is hermetically sealed, and a stirring shaft is magnetically sealed. While the stirring is continued, the system is heated to 90° C. and held for 3 hours. After completion of the reaction, the mixture is cooled at a cooling rate of 2° C./minute, then filtrated, washed with ion exchanged water, and subjected to solid-liquid separation by Nutsche suction filtration. The product is re-dispersed in 3 L of ion exchanged water at 30° C. and stirred and washed at 300 rpm for 15 minutes. This washing operation is repeated another six times. When the pH of the filtrate has reached 7.54 and its electric conductivity has reached 6.5 μS/cm, the dispersion is subjected to solid-liquid separation by Nutsche suction filtration using a No. 5A paper filter. Next, the product is continuously vacuum dried for 12 hours to thereby obtain toner particles (1).

The toner particles (1) have a volume average particle diameter (D50v) of 6.1 μm and an average circularity of 0.965.

<Production of External Additives>

—Preparation of Alkaline Catalyst Solution—

A glass-made reaction vessel equipped with a metallic stirring rod, a dropping nozzle, and a thermometer is charged with 950 parts of methanol and ammonia water ($NH_4OH$) with a concentration shown in Table 1 in an amount shown in Table 1, and the mixture is stirred to thereby obtain an alkaline catalyst solution.

—Formation of Silica Base Particles by Sol-Gel Method—

The temperature of the alkaline catalyst solution is adjusted to 40° C., and the alkaline catalyst solution is purged with nitrogen. Next, while the alkaline catalyst solution is stirred, tetramethoxysilane (TMOS) in an amount shown in Table 1 and 124 parts of ammonia water ($NH_4OH$) with a catalyst ($NH_3$) concentration of 7.9% are simultaneously added dropwise to thereby obtain a silica base particle suspension.

—Addition of Trifunctional Silane Coupling Agent—

The silica base particle suspension is heated to 40° C., and methyltrimethoxysilane (MTMS) used as the trifunctional silane coupling agent is added in an amount shown in Table 1 to the suspension under stirring. Then the stirring is continued for 120 minutes to allow the trifunctional silane coupling agent to react to thereby form an adsorption structure.

—Addition of Elemental Nitrogen-Containing Compound—

An elemental nitrogen-containing compound TP-415 described below in detail or n-hexadecyltrimethylammonium bromide is used in an amount shown in Table 1 to produce an alcohol solution diluted with butanol.

TP-415: $[N^+(CH)_3(C_{14}C_{29})_2]_4\ Mo_8O_{28}^{4-}$(N,N-Dimethyl-N-tetradec yl-1-tetradec anaminium,hexa-μ-oxotetra-μ3-oxodi-μ5-oxotetradecaoxooctamolybdate(4-) (4:1) manufactured by Hodogaya Chemical Co., Ltd.

Next, the alcohol solution prepared by diluting the elemental nitrogen-containing compound with butanol is added to the suspension. In this case, the alcohol solution is added such that the number of parts of the elemental nitrogen-containing compound based on 100 parts by mass of the solid in the silica base particle suspension is adjusted to an amount shown in Table 1. Next, the mixture is stirred at 30° C. for 100 minutes to thereby obtain a suspension containing the elemental nitrogen-containing compound.

—Drying—

Next, 300 parts by mass of the suspension is placed in a reaction bath. While the suspension is stirred, $CO_2$ is introduced. Then the temperature inside the reaction bath is increased to 150° C., and the pressure is increased to 15 MPa. While the temperature and the pressure are held, $CO_2$ is caused to flow into and out of the reaction bath at a flow rate of 5 L/minute under stirring, and then the solvent is removed over 120 minutes. Through the procedure described above, silica particles A-1 to A-13 are obtained.

TABLE 1

| | Formation of silica base particles | | | | Surface | Elemental nitrogen-containing compound | | Silica particles | | | |
|---|---|---|---|---|---|---|---|---|---|---|---|
| Silica particles Name — | Methanol Parts by mass | Ammonia water Parts by mass | Ammonia concentration % by mass | TMOS Parts by mass | coating MTMS Parts by mass | Material name — | Amount added Parts by mass | Average particle diameter nm | Average circularity — | N content (in terms of elemental N) — | Mo/Si — |
| A-1 | 950 | 166 | 9.6 | 950 | 50 | TP-415 | 5 | 61 | 0.88 | 0.040 | 0.1431 |
| A-2 | 950 | 166 | 9.6 | 950 | 22 | TP-415 | 1 | 62 | 0.88 | 0.009 | 0.0385 |
| A-3 | 950 | 166 | 9.6 | 950 | 190 | TP-415 | 45 | 61 | 0.87 | 0.371 | 0.3500 |
| A-4 | 950 | 166 | 9.6 | 950 | 30 | TP-415 | 4 | 61 | 0.89 | 0.033 | 0.1134 |
| A-5 | 950 | 232 | 5.2 | 950 | 22 | TP-415 | 5 | 63 | 0.88 | 0.042 | 0.1611 |

TABLE 1-continued

| | Formation of silica base particles | | | | Surface | Elemental nitrogen-containing compound | | Silica particles | | | |
|---|---|---|---|---|---|---|---|---|---|---|---|
| Silica particles Name — | Methanol Parts by mass | Ammonia water Parts by mass | Ammonia concentration % by mass | TMOS Parts by mass | coating MTMS Parts by mass | Material name — | Amount added Parts by mass | Average particle diameter nm | Average circularity — | N content (in terms of elemental N) — | Mo/Si — |
| A-6 | 950 | 166 | 9.6 | 950 | 260 | TP-415 | 50 | 62 | 0.89 | 0.251 | 0.6120 |
| A-7 | 950 | 166 | 9.6 | 950 | 20 | n-Hexadecyltrimethyl-ammonium bromide | 0.2 | 61 | 0.91 | 0.007 | 0.0000 |
| A-8 | 950 | 166 | 9.6 | 950 | 30 | TP-415 | 13 | 61 | 0.89 | 0.091 | 0.4500 |
| A-9 | 950 | 134 | 9.6 | 760 | 30 | TP-415 | 4.3 | 10 | 0.88 | 0.036 | 0.1431 |
| A-10 | 950 | 220 | 9.6 | 1100 | 50 | TP-415 | 6 | 100 | 0.91 | 0.047 | 0.1431 |
| A-11 | 950 | 134 | 9.6 | 740 | 30 | TP-415 | 4.3 | 8 | 0.88 | 0.036 | 0.1431 |
| A-12 | 950 | 250 | 9.6 | 1200 | 60 | TP-415 | 8 | 120 | 0.93 | 0.061 | 0.1431 |
| A-13 | 950 | 180 | 9.6 | 960 | 50 | TP-415 | 4 | 70 | 0.88 | 0.033 | 0.1431 |

<Evaluation of Silica Particles>

The following characteristics of the silica particles obtained are measured using the methods described above. The measurement values for the silica particles are shown in Table 1.

Number average particle diameter ("Average particle diameter" in Table 1)

Average circularity

Content of elemental nitrogen-containing compound in terms of elemental nitrogen ("N content (in terms of elemental N)" in Table 1)

Ratio of Net intensity of elemental molybdenum to Net intensity of elemental silicon measured by X-ray fluorescence analysis ("Mo/Si" in Table 1)

<Production of Carrier Core Material>

(Production of Ferrite Particles)

Ferrite materials in amounts shown in Table 2 are mixed and pulverized for 10 hours using a wet ball mill. Next, particles are formed using a spray dryer and dried. Next, a rotary kiln is used to subject the particles to calcination 1 at 900° C. for 6 hours. The calcined product obtained through calcination 1 is pulverized for 2 hours using a wet ball mill to adjust the average particle diameter to 2 μm. The resulting product is formed into particles using a spray dryer, and the particles are dried and subjected to calcination 2 at 950° C. for 6 hours using a rotary kiln. The calcined product obtained through calcination 2 is pulverized for 5 hours using a wet ball mill to adjust the average particle diameter to 5 μm. The resulting product is formed into particles using a spray dryer, and the particles are dried and then fired for 5 hours in an electric furnace at a temperature shown in Table 2. After the firing, a pulverization step and a classification step are performed. Through the procedure described above, ferrite particles 1 to 9 are obtained.

<Production of Carrier 1>

Toluene: 14 parts

Isopropyl alcohol: 4 parts

Cyclohexyl methacrylate (average molecular weight Mw: 50000): 2 parts

Carbon black VXC72 (manufactured by Cabot Corporation): 0.2 parts

The above components are stirred for 10 minutes using a stirrer to prepare a coating solution with these components dispersed therein. Next, this coating solution and 100 parts of the ferrite particles 1 are placed in a vacuum degassing-type kneader, stirred at 60° C. for 30 minutes, and degassed by heating under reduced pressure to thereby obtain a carrier 1.

<Production of Carriers 2 to 9>

Carriers 2 to 9 are obtained in the same manner as for the carrier 1 except that 100 parts of the ferrite particles 2 to 9, respectively, are used instead of the ferrite particles 1.

<Evaluation of Carrier Particles>

The toner particles (1) and one of the carriers are mixed at a toner ratio of 8% to obtain a developer for measurement. The developer is compression-molded to a thickness of 5 mm. Next, an LCR meter manufactured by Wayne Kerr is used to measure the relative dielectric loss factor under the conditions of 6 KHz and 5 V (RSM), and the results are shown in Table 2. The detailed compositions of the ferrite particles 1 to 9 are shown in Table 3.

TABLE 2

| Ferrite | Ferrite materials (parts) | | | | | | | Electric furnace | | Relative dielectric loss factor of |
|---|---|---|---|---|---|---|---|---|---|---|
| particles | $Fe(OH)_2$ | $MnO_2$ | $Mg(OH)_2$ | $TiO_2$ | $ZrO_2$ | $SrCO_3$ | $SiO_2$ | (° C.) | Carrier | carrier |
| Ferrite particles 1 | 2340 | 8.6 | 220 | 70 | 0 | 0 | 0 | 1250 | Carrier 1 | 1.2 |
| Ferrite particles 2 | 2340 | 8.6 | 220 | 0 | 50 | 0 | 0 | 1250 | Carrier 2 | 1.0 |
| Ferrite particles 3 | 2250 | 0 | 60 | 0 | 50 | 0 | 10 | 1270 | Carrier 3 | 0.5 |
| Ferrite particles 4 | 2250 | 90 | 230 | 70 | 0 | 0 | 0 | 1240 | Carrier 4 | 2.0 |
| Ferrite particles 5 | 2340 | 8.6 | 220 | 0 | 0 | 56 | 20 | 1250 | Carrier 5 | 1.8 |

TABLE 2-continued

| Ferrite particles | Ferrite materials (parts) Fe(OH)$_2$ | MnO$_2$ | Mg(OH)$_2$ | TiO$_2$ | ZrO$_2$ | SrCO$_3$ | SiO$_2$ | Electric furnace (° C.) | Carrier | Relative dielectric loss factor of carrier |
|---|---|---|---|---|---|---|---|---|---|---|
| Ferrite particles 6 | 2520 | 0 | 110 | 0 | 45 | 0 | 20 | 1270 | Carrier 6 | 0.4 |
| Ferrite particles 7 | 2300 | 350 | 60 | 0 | 0 | 0 | 20 | 1240 | Carrier 7 | 2.2 |
| Ferrite particles 8 | 2340 | 8.6 | 220 | 0 | 0 | 56 | 10 | 1260 | Carrier 8 | 1.7 |
| Ferrite particles 9 | 2250 | 0 | 60 | 0 | 50 | 0 | 0 | 1260 | Carrier 9 | 0.7 |

TABLE 3

| Ferrite particles | k in formula (1) | Ratio with respect to 1 mole of Fe (moles) Mn | Mg | Ti | Zr | Sr | Si |
|---|---|---|---|---|---|---|---|
| Ferrite particles 1 | 1.27 | 0.0038 | 0.145 | 0.034 | 0 | 0 | 0 |
| Ferrite particles 2 | 1.29 | 0.0038 | 0.145 | 0 | 0.016 | 0 | 0 |
| Ferrite particles 3 | 1.40 | 0 | 0.041 | 0 | 0.016 | 0 | 0.007 |
| Ferrite particles 4 | 1.22 | 0.0413 | 0.158 | 0.035 | 0 | 0 | 0 |
| Ferrite particles 5 | 1.28 | 0.0038 | 0.145 | 0 | 0 | 0.015 | 0.013 |
| Ferrite particles 6 | 1.37 | 0 | 0.067 | 0 | 0.013 | 0 | 0.012 |
| Ferrite particles 7 | 1.24 | 0.1573 | 0.040 | 0 | 0 | 0 | 0.013 |
| Ferrite particles 8 | 1.28 | 0.0038 | 0.145 | 0 | 0 | 0.015 | 0.007 |
| Ferrite particles 9 | 1.42 | 0 | 0.041 | 0 | 0.016 | 0 | 0 |

<Production of Developers>

One type of silica particles (an external additive) shown in Table 4 are added to 100 parts of the toner particles (1) such that the amount of silica in the toner is as shown in Table 4, and these are mixed for 15 minutes using a Henschel mixer at a stirring peripheral speed of 30 msec. Toners in Examples and Comparative Examples are thereby obtained.

One of the toners obtained and one of the carriers 1 to 9 are placed in a V blender such that the ratio of the toner is as shown in "Ratio of toner in developer (%)" in Table 4, and the mixture is stirred for 20 minutes. Through the procedure described above, developers in Examples 1 to 21 and Comparative Examples 1 to 4 are obtained. The weight ratio (silica/carrier) of silica to the carrier in each developer is shown in Table 4.

<Evaluation of Occurrence of White Spots>

For each of the developers in Examples 1 to 21 and Comparative Examples 1 to 4, DocuCentre Color 400CP (manufactured by FUJIFILM Business Innovation Corp.) is used to output 100 blank sheets under the conditions of 25° C. and 15% RH. Next, a 10 cm square solid image is printed on 10 sheets in a half-speed mode, and the number white spots (color loss spots) is counted.

The number of white spots and judgement according to the following criteria for each of the Examples and Comparative Examples are shown in Table 4. The ratings A and B are permissible levels.

—Evaluation Criteria—

A: Number of white spots: 0 to 1

B: Number of white spots: 2 to 4

C: Number of white spots: 5 or more

As can be seen from Table 4, when the developers in the Examples are used for printing, the occurrence of white spots is reduced.

TABLE 4

| | Toner Type of toner | Silica particles | Mo/Si | Silica in toner (%) | Ratio of toner in developer (%) | Carrier Carrier | Relative dielectric loss factor of carrier | Silica/carrier | Evaluation Number of white spots | Judgement |
|---|---|---|---|---|---|---|---|---|---|---|
| Example 1 | 1 | A-1 | 0.1431 | 1.0 | 8 | 1 | 1.2 | 0.087 | 0 | A |
| Example 2 | 2 | A-2 | 0.0835 | 1.0 | 8 | 1 | 1.2 | 0.087 | 2 | B |
| Example 3 | 3 | A-3 | 0.3500 | 1.0 | 8 | 1 | 1.2 | 0.087 | 2 | B |
| Example 4 | 1 | A-1 | 0.1431 | 1.0 | 8 | 2 | 1.0 | 0.087 | 0 | A |
| Example 5 | 1 | A-1 | 0.1431 | 1.0 | 8 | 3 | 0.5 | 0.087 | 2 | B |
| Example 6 | 1 | A-1 | 0.1431 | 1.0 | 8 | 8 | 0.7 | 0.087 | 1 | A |
| Example 7 | 1 | A-1 | 0.1431 | 1.0 | 8 | 9 | 1.7 | 0.087 | 1 | A |
| Example 8 | 1 | A-1 | 0.1431 | 1.0 | 8 | 4 | 2.0 | 0.087 | 3 | B |
| Example 9 | 1 | A-1 | 0.1431 | 1.0 | 8 | 5 | 1.8 | 0.087 | 3 | B |
| Example 10 | 4 | A-1 | 0.1431 | 0.6 | 6 | 1 | 1.2 | 0.030 | 1 | A |
| Example 11 | 4 | A-1 | 0.1431 | 0.6 | 6 | 1 | 1.2 | 0.039 | 0 | A |
| Example 12 | 4 | A-1 | 0.1431 | 0.6 | 6 | 1 | 1.2 | 0.150 | 1 | A |
| Example 13 | 5 | A-1 | 0.1431 | 1.2 | 12 | 1 | 1.2 | 0.157 | 3 | B |
| Example 14 | 1 | A-4 | 0.1134 | 1.0 | 8 | 1 | 1.2 | 0.087 | 0 | A |
| Example 15 | 1 | A-5 | 0.1611 | 1.0 | 8 | 1 | 1.2 | 0.087 | 0 | A |
| Example 16 | 1 | A-8 | 0.4500 | 1.0 | 8 | 1 | 1.2 | 0.087 | 3 | B |
| Example 17 | 1 | A-9 | 0.1431 | 1.0 | 8 | 1 | 1.2 | 0.087 | 0 | A |
| Example 18 | 1 | A-10 | 0.1431 | 1.0 | 8 | 1 | 1.2 | 0.087 | 1 | A |
| Example 19 | 1 | A-11 | 0.1431 | 1.0 | 8 | 1 | 1.2 | 0.087 | 3 | B |

TABLE 4-continued

| | Toner | | | | | Carrier | | Evaluation | | |
|---|---|---|---|---|---|---|---|---|---|---|
| | Type of toner | Silica particles | Mo/Si | Silica in toner (%) | Ratio of toner in developer (%) | Carrier | Relative dielectric loss factor of carrier | Silica/carrier | Number of white spots | Judgement |
| Example 20 | 1 | A-12 | 0.1431 | 1.0 | 8 | 1 | 1.2 | 0.087 | 4 | B |
| Example 21 | 1 | A-13 | 0.1431 | 1.0 | 8 | 1 | 1.2 | 0.087 | 0 | A |
| Comparative Example 1 | 6 | A-6 | 0.6120 | 1.0 | 8 | 1 | 1.2 | 0.087 | 5 | C |
| Comparative Example 2 | 7 | A-7 | 0.0000 | 1.0 | 8 | 1 | 1.2 | 0.087 | 5 | C |
| Comparative Example 3 | 1 | A-1 | 0.1431 | 1.0 | 8 | 6 | 0.4 | 0.087 | 5 | C |
| Comparative Example 4 | 1 | A-1 | 0.1431 | 1.0 | 8 | 7 | 2.2 | 0.087 | 7 | C |

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Appendix (((1)))

An electrostatic image developer including:

toner particles;

silica particles that are externally added to the toner particles and include an elemental nitrogen-containing compound containing elemental molybdenum and in which the ratio (Mo/Si) of a Net intensity of elemental molybdenum that is measured by X-ray fluorescence analysis to a Net intensity of elemental silicon in the silica particles that is measured by the X-ray fluorescence analysis is from 0.035 to 0.45 inclusive; and a carrier having a relative dielectric loss factor of from 0.5 to 2.0 inclusive.

(((2)))

The electrostatic image developer according to (((1))), wherein the carrier is formed of ferrite, and wherein the ferrite contains at least one of titanium and zirconium.

(((3)))

The electrostatic image developer according to (((1))) or (((2))), wherein the relative dielectric loss factor of the carrier is from 0.7 to 1.7 inclusive.

(((4)))

The electrostatic image developer according to (((2))) or (((3))), wherein the ferrite further contains manganese and magnesium.

(((5)))

The electrostatic image developer according to any one of (((1))) to (((4))), wherein the weight ratio (silica/carrier) of the silica particles to the carrier is from 0.03 to 0.15 inclusive.

(((6)))

The electrostatic image developer according to any one of (((1))) to (((5))), wherein the ratio (Mo/Si) of the Net intensity of elemental molybdenum to the Net intensity of elemental silicon is from 0.10 to 0.30 inclusive.

(((7)))

The electrostatic image developer according to any one of (((1))) to (((6))), wherein the elemental nitrogen-containing compound containing elemental molybdenum is a quaternary ammonium salt containing elemental molybdenum.

(((8)))

The electrostatic image developer according to any one of (((1))) to (((7))), wherein the silica particles have a number average particle diameter of from 10 nm to 100 nm inclusive.

(((9)))

The electrostatic image developer according to (((8))), wherein the silica particles each include:

a silica base particle; and a structure that covers at least part of a surface of the silica base particle and is formed from a reaction product of a trifunctional silane coupling agent and in which the elemental nitrogen-containing compound containing elemental molybdenum is adsorbed on at least part of pores in the reaction product of the trifunctional silane coupling agent.

(((10)))

A process cartridge detachably attached to an image forming apparatus, the process cartridge including a developing device that houses the electrostatic image developer according to any one of (((1))) to (((9))) and develops, as a toner image, an electrostatic image formed on a surface of an image holding member with the electrostatic image developer.

(((11)))

An image forming apparatus including:

an image holding member;

a charging device that charges a surface of the image holding member;

an electrostatic image forming device that forms an electrostatic image on the charged surface of the image holding member;

a developing device that houses the electrostatic image developer according to any one of (((1))) to (((9))) and develops, as a toner image, the electrostatic image formed on the surface of the image holding member with the electrostatic image developer;

a transferring device that transfers the toner image formed on the surface of the image holding member onto a surface of a recording medium; and a fixing device that fixes the toner image transferred onto the surface of the recording medium.

(((12)))

An image forming method including:

charging a surface of an image holding member;

forming an electrostatic image on the charged surface of the image holding member;

developing, as a toner image, the electrostatic image formed on the surface of the image holding member with the electrostatic image developer according to any one of (((1))) to (((9)));

transferring the toner image formed on the surface of the image holding member onto a surface of a recording medium; and fixing the toner image transferred onto the surface of the recording medium.

What is claimed is:

1. An electrostatic image developer comprising:

toner particles;

silica particles that are externally added to the toner particles and include an elemental nitrogen-containing compound containing elemental molybdenum and in which a ratio (Mo/Si) of a Net intensity of elemental molybdenum that is measured by X-ray fluorescence analysis to a Net intensity of elemental silicon in the silica particles that is measured by the X-ray fluorescence analysis is from 0.035 to 0.45 inclusive; and a carrier having a relative dielectric loss factor of from 0.5 to 2.0 inclusive, wherein the silica particles each include:

a silica base particle; and a structure that covers at least part of a surface of the silica base particle and is formed from a reaction product of a trifunctional silane coupling agent and in which the elemental nitrogen-containing compound containing elemental molybdenum is adsorbed on at least part of pores in the reaction product of the trifunctional silane coupling agent, and wherein the carrier is formed of ferrite.

2. The electrostatic image developer according to claim 1, wherein the ferrite contains at least one of titanium and zirconium.

3. The electrostatic image developer according to claim 2, wherein the relative dielectric loss factor of the carrier is from 0.7 to 1.7 inclusive.

4. The electrostatic image developer according to claim 2, wherein the ferrite further contains manganese and magnesium.

5. The electrostatic image developer according to claim 1, wherein a weight ratio (silica/carrier) of the silica particles to the carrier is from 0.03 to 0.15 inclusive.

6. The electrostatic image developer according to claim 5, wherein the ratio (Mo/Si) of the Net intensity of elemental molybdenum to the Net intensity of elemental silicon is from 0.10 to 0.30 inclusive.

7. The electrostatic image developer according to claim 6, wherein the elemental nitrogen-containing compound containing elemental molybdenum is a quaternary ammonium salt containing elemental molybdenum.

8. The electrostatic image developer according to claim 1, wherein the silica particles have a number average particle diameter of from 10 nm to 100 nm inclusive.

9. A process cartridge detachably attached to an image forming apparatus, the process cartridge comprising a developing device that houses the electrostatic image developer according to claim 1 and develops, as a toner image, an electrostatic image formed on a surface of an image holding member with the electrostatic image developer.

10. An image forming apparatus comprising:

an image holding member;

a charging device that charges a surface of the image holding member;

an electrostatic image forming device that forms an electrostatic image on the charged surface of the image holding member;

a developing device that houses the electrostatic image developer according to claim 1 and develops, as a toner image, the electrostatic image formed on the surface of the image holding member with the electrostatic image developer;

a transferring device that transfers the toner image formed on the surface of the image holding member onto a surface of a recording medium; and a fixing device that fixes the toner image transferred onto the surface of the recording medium.

11. An image forming method comprising:

charging a surface of an image holding member;

forming an electrostatic image on the charged surface of the image holding member;

developing, as a toner image, the electrostatic image formed on the surface of the image holding member with the electrostatic image developer according to claim 1;

transferring the toner image formed on the surface of the image holding member onto a surface of a recording medium; and fixing the toner image transferred onto the surface of the recording medium.

* * * * *